(12) United States Patent
Goto et al.

(10) Patent No.: US 8,109,622 B2
(45) Date of Patent: Feb. 7, 2012

(54) RECORDING INK, INK CARTRIDGE, INKJET RECORDING METHOD, AND INKJET RECORDING APPARATUS

(75) Inventors: Hiroshi Goto, Atsugi (JP); Akihiko Matsuyama, Isehara (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 503 days.

(21) Appl. No.: 12/282,437

(22) PCT Filed: Mar. 9, 2007

(86) PCT No.: PCT/JP2007/055303
§ 371 (c)(1),
(2), (4) Date: Sep. 10, 2008

(87) PCT Pub. No.: WO2007/105806
PCT Pub. Date: Sep. 20, 2007

(65) Prior Publication Data
US 2009/0098312 A1   Apr. 16, 2009

(30) Foreign Application Priority Data
Mar. 10, 2006 (JP) .................................. 2006-065610

(51) Int. Cl.
*G01D 11/00* (2006.01)
(52) U.S. Cl. ............................ 347/100; 347/95; 106/31.6
(58) Field of Classification Search .................. 347/100, 347/95, 96, 101, 102; 106/31.6, 31.27, 31.13; 523/160, 161
See application file for complete search history.

(56) References Cited

U.S. PATENT DOCUMENTS

| 5,969,033 | A | 10/1999 | Pearlstine | |
|---|---|---|---|---|
| 7,132,464 | B2 * | 11/2006 | Nakamura et al. | 523/160 |
| 2002/0077383 | A1 | 6/2002 | Takao et al. | |
| 2004/0179066 | A1 * | 9/2004 | Arita et al. | 347/100 |
| 2009/0043028 | A1 * | 2/2009 | Matsuyama et al. | 524/377 |
| 2010/0225707 | A1 * | 9/2010 | Kudo et al. | 347/100 |

FOREIGN PATENT DOCUMENTS

| EP | 0 921 166 A1 | 6/1999 |
|---|---|---|
| EP | 1 460 111 A1 | 9/2004 |
| JP | 55 157668 | 12/1980 |

(Continued)

OTHER PUBLICATIONS

European Search Report issued Dec. 2, 2010 in EP 07 73 8750.

*Primary Examiner* — Manish S Shah
(74) *Attorney, Agent, or Firm* — Oblon, Spivak, McClelland, Maier & Neustadt, L.L.P.

(57) ABSTRACT

The present invention provides a recording ink including a composite pigment particle, a water-soluble solvent, and water, wherein the composite pigment particle is a primary particle coated with a coating resin, wherein the primary particle is a white pigment on the surface of which an oil-soluble dye is adsorbed or attached. In one aspect, the white pigment is preferably at least one selected from a white inorganic pigment, a pearl pigment, and an extender pigment, in another aspect, the coating resin is preferably one of a (meth) acrylic resin, a polyester resin, and a polyurethane resin, wherein the acid value of the coating resin is from 50 mgKOH/g to 250 mgKOH/g, and in another aspect, an average particle diameter (D50%) of the composite pigment particle is preferably 150 nm or less.

11 Claims, 2 Drawing Sheets

FOREIGN PATENT DOCUMENTS

| | | |
|---|---|---|
| JP | 62 1426 | 1/1987 |
| JP | 1 217088 | 8/1989 |
| JP | 8 183920 | 7/1996 |
| JP | 08183920 A * | 7/1996 |
| JP | 9 151344 | 6/1997 |
| JP | 09151344 A * | 6/1997 |
| JP | 9 263720 | 10/1997 |
| JP | 9 263722 | 10/1997 |
| JP | 11 166127 | 6/1999 |
| JP | 11 246808 | 9/1999 |
| JP | 2001 192582 | 7/2001 |
| JP | 2001 342388 | 12/2001 |
| JP | 2002 88286 | 3/2002 |
| JP | 2002 146231 | 5/2002 |
| JP | 2002 161221 | 6/2002 |
| JP | 2003 49096 | 2/2003 |
| JP | 2003 49097 | 2/2003 |
| JP | 2003 55591 | 2/2003 |
| JP | 2003 105229 | 4/2003 |
| JP | 2003 171594 | 6/2003 |
| JP | 2003 192938 | 7/2003 |
| JP | 2003 268278 | 9/2003 |
| JP | 2003 327866 | 11/2003 |
| JP | 2003 327880 | 11/2003 |
| JP | 2006 8794 | 1/2006 |

* cited by examiner

RECORDING INK, INK CARTRIDGE, INKJET RECORDING METHOD, AND INKJET RECORDING APPARATUS

TECHNICAL FIELD

The present invention relates to recording ink suitable for inkjet recording, which excels in discharge stability with no head clogging at the time of printing and preservation stability resulting in an image production of good image retention capabilities such as waterproofness and light stability, etc., and is able to obtain a high quality image with good color tone on the regular paper as well as on an exclusive recording paper; ink cartridge, inkjet recording method and inkjet recording apparatus that utilize the recording ink respectively.

BACKGROUND ART

Recently, inkjet printers has been rapidly diffused for its advantageous properties such as low noise and low running cost, and color printers which is printable on the regular paper has been actively provided to the market. However, satisfying all the properties required such as color reproducibility, endurance, light stability, drying property, feathering and color bleed of images, duplex printing, discharge stability, and the like is very difficult for those inkjet printers, the inks which correspond to each preferred property are being selectively used instead.

The inks for use in such inkjet recording in general consist mainly of water and contain colorant (e.g. dye, pigment) and moistening agent such as glycerin, and the like for anticlogging. Dyes, for its excellent color-producing property and stability, are used as colorant. However, light stability and waterproofness, etc. of the images produced by dye's inks are not satisfactory. Waterproofness may be improved somehow by upgrading the inkjet recording paper containing ink absorber layer, however, it is unsatisfactory for the regular paper.

Recently, in order to improve these problems a recording ink, of which a pigment such as organic pigment, carbon black, and the like instead of dyes is reduced to particles using surfactants or dispersants and dispersed in a medium such as water, is being investigated for use as a colorant. For example, the process for improving discharge stability in which an organic pigment is reduced to particles of 50 nm or less in diameter using specific dispersant, is disclosed in Patent Literatures 1 and 2. And an ink for inkjet printing using specific organic pigment and anionic dispersant is disclosed in Patent Literature 3.

However, using any dispersant does not help atomizing smaller than primary particle of the organic pigment and making diameter of the primary particle of the organic pigment 50 nm or less without degrading color tone is almost impossible. Also, there are problems in that when a low-molecular dispersant is used, scratch resistance and waterproofness are low, and that when a high-molecular dispersant is used, scratch resistance and waterproofness are insufficient.

Because inkjet recording requires a stable discharge of ink droplets from a microscopic nozzle of the inkjet recording head, ink solidification caused by drying of orifice of the inkjet recording head should be avoided. However, when an ink in which the above-mentioned organic pigment is dispersed is used for the inkjet recording, clogging or no discharge of the ink may occur. Especially when printing is suspended for a long period, the clogging of nozzle, etc. are likely to occur, and the thickened ink may be deposited in the maintenance mechanism such as inside the nozzle caps or suction tubes, hindering functions of the maintenance mechanism. Furthermore, when printing was temporarily suspended, or the nozzle corresponding to the space of printing documents or images having spaces was suspended for a while, there have been a lot of problems such as printing failures (intermittent discharge failures) caused by distorted injection direction of ink droplets.

The other dispersion method include, for example, the surface reforming recording ink by which the surface of the pigment particles may be stably dispersed without pigment dispersant by modifying it with carboxyl group, carbonyl group, sulfone group and hydroxyl group, and the like and giving hydrophilic property. The surface reforming carbon black, a black recording ink by which the pigment particles can be stably dispersed without pigment dispersant by introducing hydrophilic groups on the surface of carbon, has been developed. The surface reforming color pigment, a color pigment ink by which the pigment particles can be stably dispersed without pigment dispersant has also been developed. However, scratch resistance and waterproofness of these surface reforming recording inks on the regular paper or exclusive gloss paper are not sufficient.

To solve these problems, an inkjet ink utilizing the dispersing element of micro-capsule or emulsion type by which the pigment particles are coated with resin is proposed. In this proposal, since the pigment particles are coated solidly by resin, dispersion may be stable for a long period and the discharge stability may be improved somewhat, however, it is difficult to reduce the dispersion particle diameter to 100 nm or less even coating with a pigment of the primary particle diameter of 50 nm to 100 nm.

An inkjet ink is proposed in Patent Literatures 4 and 5 wherein the particle diameter of contained color materials is made into a uniform nanometer size by attaching dyes to the surface of a metal oxide and coating the surface with an ionic group-containing organic compound. By this proposal, waterproofness is improved somewhat compared to the ink utilizing dyes; however, light stability is inferior to the dye ink therefore not appropriate for actual use.

If a dispersant is used for dispersion of above pigment, or if the surface of the pigment is made hydrophilic, a method in which a polymer is added to the ink for making up insufficient waterproofness and scratch resistance may be used, however, it is impossible to obtain sufficient waterproofness with soluble polymer. For this reason, a method of using a water dispersible polymer particle is proposed. However, if the water dispersible polymer particle remains in a form of a particle on the ink record after printing, the particle may easily be re-dispersed in water and therefore waterproofness is not sufficient.

Recently, a composite pigment by which an organic pigment is coated around the inorganic pigment particle is proposed. If the inorganic pigment particle of around 5 nm to 50 nm is utilized as a core material, it is possible to obtain a coloring pigment of less than 100 nm even when being coated with an organic pigment. The composite pigment color material of 10 nm to 20 nm has been proposed and practically applied as disclosed in Patent Literatures 6 and 7. And applying these composite pigment particles to paints or inkjet inks are also proposed as disclosed in Patent Literatures 8 and 9. However, in these proposals, it is difficult to ensure the dispersion stability of pigment, especially the dispersion stability under preservation for a long period. Further, since resins for fixing are not contained, waterproofness and scratch resistance of ink records are insufficient.

Examples of ink composition containing polymers include an ink in which pigment and polymer emulsion are dispersed in water as outlined in Patent Literature 10, an ink in which a pigment is dispersed in polymer emulsion/dispersion of water-insoluble resin as outlined in Patent Literature 11 and an ink using a polymer emulsion having specified film-forming temperature as outlined in Patent Literature 12.

To improve fixing ability of composite pigment particles, addition of high-molecular dispersant is proposed in many literatures (e.g. Patent Literatures 13, 14, 15, 16, 17, 18, 19 and 20). In these proposals, approaches are done to give a dispersant a fixing function by using high-molecular dispersant, however, because the high-molecular dispersant proposed above is highly water-soluble, sufficient waterproofness cannot be obtained although scratch resistance may be in sufficient level.

Furthermore, an ink containing emulsion resin for improving waterproofness of ink records utilizing these composite pigment particles is proposed in Patent Literature 21. However, because this emulsion resin is water dispersible, it becomes re-dispersed when ink records get wet; therefore cannot prevent the outflow of pigment particles.

Thus, in the present situation, it has been desired that a recording ink which excels in discharge stability and preservation stability, which has good image retention capabilities such as scratch resistance, waterproofness and light stability, etc., which makes it possible to obtain a high quality image that excels in color reproducibility of color image, and which is suitable for inkjet recording; and related techniques are provided as soon as possible.

Patent Literature 1 Japanese Patent Application Laid-Open (JP-A) No. 09-263720
Patent Literature 2 JP-A No. 09-263722
Patent Literature 3 JP-A No. 2002-088286
Patent Literature 4 JP-A No. 11-166127
Patent Literature 5 JP-A No. 2001-192582
Patent Literature 6 JP-A No. 2002-146231
Patent Literature 7 JP-A No. 2002-161221
Patent Literature 8 JP-A No. 2003-049096
Patent Literature 9 JP-A No. 2003-055591
Patent Literature 10 Japanese Patent Application Publication (JP-B) No. 62-001426
Patent Literature 11 JP-A No. 55-157668
Patent Literature 12 JP-A No. 01-217088
Patent Literature 13 JP-A No. 2003-049096
Patent Literature 14 JP-A No. 2003-055591
Patent Literature 15 JP-A No. 2003-105229
Patent Literature 16 JP-A No. 2003-171594
Patent Literature 17 JP-A No. 2003-192938
Patent Literature 18 JP-A No. 2003-327866
Patent Literature 19 JP-A No. 2003-268278
Patent Literature 20 JP-A No. 2003-327880
Patent Literature 21 JP-A No. 2003-049097

DISCLOSURE OF INVENTION

An object of the present invention is to provide recording ink which excels in discharge stability and preservation stability, which has good image retention capabilities such as scratch resistance, waterproofness and light stability, etc., which makes it possible to obtain a high quality image that excels in color reproducibility of color image, and which is suitable for inkjet recording; ink cartridge, inkjet recording method, and inkjet recording apparatus that utilize the recording ink respectively.

Means for solving the above-mentioned problems are as follows. Specifically,

<1> A recording ink including a composite pigment particle, a water-soluble solvent, and water, wherein the composite pigment particle is a primary particle coated with a coating resin, wherein the primary particle is a white pigment on the surface of which an oil-soluble dye is adsorbed or attached.

<2> The recording ink according to the <1>, wherein the white pigment is at least one selected from a white inorganic pigment, a pearl pigment, and an extender pigment.

<3> The recording ink according to one of the <1> and <2>, wherein the coating resin is one of a (meth)acrylic resin, a polyester resin, and a polyurethane resin, wherein the acid value of the coating resin is from 50 mgKOH/g to 250 mgKOH/g.

<4> The recording ink according to any one of the <1> to <3>, wherein an average particle diameter (D50%) of the composite pigment particle is 150 nm or less.

<5> The recording ink according to any one of the <1> to <4>, wherein the water-soluble solvent is at least one selected from glycerin, diethylene glycol, triethylene glycol, 1,3-butanediol and 3-methyl-1,3-butanediol.

<6> The recording ink according to any one of the <1> to <5>, further including a water dispersible resin, wherein the water dispersible resin is one of a polyester resin, a polyurethane resin, a (meth)acrylic resin and an acrylic silicone resin, and the minimum film-forming temperature of the water dispersible resin is 30° C. or less.

<7> The recording ink according to any one of the <1> to <6>, further including a surfactant, wherein the surfactant includes at least one selected from a silicone surfactant and a fluorosurfactant.

<8> The recording ink according to any one of the <1> to <7>, wherein the static surface tension at 25° C. is 35 mN/m or less.

<9> An ink cartridge including the recording ink of any one of the <1> to <8>, wherein the recording ink is contained in a container.

<10> An inkjet recording method including ink drop discharging to record an image by stimulating the recording ink of any one of the <1> to <8>.

<11> The inkjet recording method according to the <10>, wherein the stimulation is at least one selected from heat, pressure, vibration and light.

<12> An inkjet recording apparatus including an ink drop discharging unit configured to discharge recording ink drops to record an image by stimulating the recording ink of any one of the <1> to <8>.

<13> The inkjet recording apparatus according to the <12>, wherein the stimulation is at least one selected from heat, pressure, vibration and light.

<14> An ink record including an image formed on a recording medium using the recording ink of any one of the <1> to <8>.

The recording ink of the present invention includes a composite pigment particle, a water-soluble solvent, and water, wherein the composite pigment particle is a primary particle coated with a coating resin, wherein the primary particle is a white pigment on the surface of which an oil-soluble dye is adsorbed or attached. Thus, the recording ink of the present invention has good image retention capabilities such as scratch resistance, waterproofness and light stability, etc., and a high quality image that excels in discharge stability and color reproducibility of color image can be obtained.

The ink cartridge of the present invention includes the recording ink of the present invention, wherein the recording ink is contained in a container. The ink cartridge is suitably used for printers, etc. using an inkjet recording system. When recording is performed using the ink contained in the ink cartridge, the recording ink excels in discharge stability and preservation stability with no head clogging at the time of printing resulting in an image production of good image retention capabilities such as waterproofness and light stability, etc., and a high quality image with good color tone can be obtained on the regular paper as well as on an exclusive recording paper.

The inkjet recording apparatus of the present invention includes an ink drop discharging unit configured to discharge recording ink drops to record an image by applying energy to the recording ink of the present invention. In the inkjet recording apparatus, the ink drop discharging unit applies energy to the recording ink of the present invention, thereby discharging recording ink drops to record an image. Consequently, discharge stability is excellent without head clogging at the time of printing resulting in an image production of good image retention capabilities such as waterproofness and light stability, etc., and a high quality image with good color tone can be obtained on the regular paper as well as on an exclusive recording paper.

The inkjet recording method of the present invention includes ink drop discharging to record an image by applying energy to the recording ink of the present invention. In the inkjet recording method, in the ink drop discharging, energy is applied to the recording ink of the present invention, thereby discharging recording ink drops to record an image. Consequently, discharge stability is excellent without head clogging at the time of printing resulting in an image production of good image retention capabilities such as waterproofness and light stability, etc., and a high quality image with good color tone can be obtained on the regular paper as well as on an exclusive recording paper.

The ink record of the present invention includes an image formed on a recording medium using the recording ink of the present invention. In the ink record of the present invention, discharge stability is excellent without head clogging at the time of printing resulting in an image production of good image retention capabilities such as waterproofness and light stability, etc., and a high quality image with good color tone is retained on the recording medium such as a regular paper as well as an exclusive recording paper.

Figure 1:
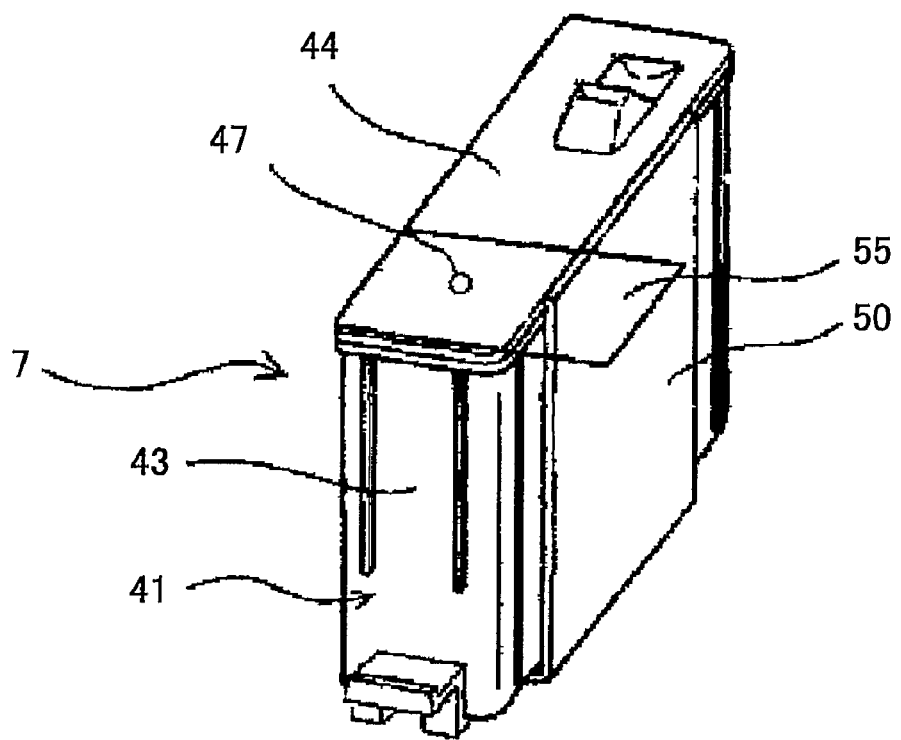
FIG. 1 is an external perspective view of an exemplary ink cartridge before being installed in the inkjet recording apparatus of the present invention.

BEST MODE FOR CARRYING OUT THE INVENTION (Recording Ink)

The recording ink of the present invention comprises at least a composite pigment particle, a water-soluble solvent and water, and a penetrating agent, pH controlling agent, and may further comprise other elements as necessary.
—Composite Pigment Particle—

The composite pigment particle is a primary particle coated with a coating resin, wherein the primary particle is a white pigment on the surface of which an oil-soluble dye is adsorbed or attached.

The composite pigment particle can be prepared by the processes such as (1) precipitation of oil-soluble dye in the presence of white pigment, (2) mechanical mixing, abrasion and cracking of the white pigment and oil-soluble dye, and the like. Furthermore, if necessary, by placing the organosilane compound layer generated from polysiloxane and alkylsilane between white inorganic pigment and oil-soluble dye, the adhesiveness of both can be enhanced. The primary particle, which is a white pigment on the surface of which an oil-soluble dye is adsorbed or attached, is coated with a resin having a hydrophilic group and microencapsulated, thereby providing dispersion stability. Such composite pigment particle will be described in detail below.

For the white pigment, at least one pigment selected from a white inorganic pigment, a pearl pigment, and an extender pigment is suitable.

Examples of the white inorganic pigment include titanium dioxide, zinc oxide, zirconium oxide, and the like.

Examples of the pearl pigment include titanated mica, white mica, and the like.

Examples of the extender pigment include fine silica particles such as silica powder, white carbon, fine silicic acid powder and diatomaceous earth; clay, kaolin, calcium carbonate, barium sulfate, alumina white, talc, transparent titanium oxide, and the like.

The white pigment may be selected according to properties as required therefor or applications thereof. The white pigments are preferable in applications requiring a hiding power, the pearl pigments are preferable in applications requiring pearl-like gloss, and pearl pigments or extender pigments are preferable in applications requiring transparency. Titanium dioxide, zinc oxide, and fine silica particles are more preferable.

The form of particle of the white pigment may be any form such as spherical, granular, polyhedron-shaped, needle-shaped, spindle-shaped, rice grain-shaped, flaky, scaly, and plate-shaped.

The particle size of the white pigment powder is, in terms of average primary particle diameter, preferably 120 nm or less, and more preferably 5 nm to 50 nm. Since inks for inkjet recording are formulated finally, the average particle diameter (D50%) of composite pigment particle coated with resin is preferably 150 nm or less. Thus, inevitably, the particle size of the white inorganic pigment powder is required to be less than it.

The oil-soluble dye adsorbed or attached on the surface of the white pigment include dyes insoluble or poorly-soluble in water, for example, oil dye, disperse dye, and the like.

The oil dye is not limited and may be selected accordingly; examples thereof include C.I. Solvent Black 3, 7, 27, 29 and 34; C.I. Solvent Yellow 4, 16, 29, 33, 54, 56, 82, 93, 157, and 160; C.I. Solvent Red 1, 3, 8, 18, 23, 24, 27, 43, 51, 52, 72, 73, 111, 135, 146, 168, 179, 207, and 242; C.I. Solvent Violet 13 and 36; C.I. Solvent Blue 2, 11, 35, 36, 59, 63, 70, 78, 87, 94, and 97; C.I. Solvent Green 3, 5, 7, and 20; C.I. Solvent Orange 55, 60, 63, and 80; and the like.

The disperse dye is not limited and may be selected accordingly; examples thereof include C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 22, 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 28, 31 and 33; C.I. Disperse Blue 14, 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1; and the like. Two or more of dyes that contains these dyes may be used in combination.

The mass ratio of the white pigment to the oil-soluble dye as a color material, white pigment: oil-soluble dye, is preferably 10:1 to 2:1. If the mass ratio of the color material is small, color-producing property or tinctorial power may be deteriorated and if the mass ratio of the color material increases, color tones or light stability may be deteriorated.

The methods for preparing a primary particle, which is a white inorganic pigment particle on the surface of which an oil-soluble dye is adsorbed or attached, are broadly classified into the following two methods:
(1) fine white inorganic pigment powder is added to a solution of oil-soluble dye dissolved in an organic solvent and mixed well, then only the organic solvent is removed using a rotary evaporator, and dry ground mechanically or wet dispersed in an aqueous system, into which a dispersant or the like is used, to thereby prepare a primary particle; and
(2) Fine white inorganic pigment powder and oil-soluble dye are mechanically mixed well, and then dry ground or wet dispersed in an aqueous system, into which a dispersant or the like is used, to thereby prepare a primary particle.

The organic solvent for use when producing the primary particle to which an oil-soluble dye is adsorbed or attached, is not particularly limited and may be selected based on the solubility of the oil-soluble dye. Examples of the organic solvent include ketone solvents such as acetone, methyl ethyl ketone, and diethyl ketone; alcohol solvents such as methanol, ethanol, 2-propanol, 1-propanol, 1-butanol and tert-butanol; chlorine solvents such as chloroform and methylene chloride; aromatic solvents such as benzene and toluene; ester solvents such as ethyl acetate, butyl acetate and isopropyl acetate, ether solvents such as diethyl ether, tetrahydrofuran and dioxane; glycol ether solvents such as ethylene glycol monomethyl ether and ethylene glycol dimethyl ether; and the like.

The equipment for dry grinding a coloring pigment to be used for preparing the primary particle is not limited as long as it is an apparatus that can make pigment fine using insoluble inorganic fine particles, and the equipment may be selected accordingly. The equipment include an apparatus which can perform shearing, spatula patting and compression at the same time, for example, a wheel-type kneader, a blade-type kneader, a ball-type kneader, and a roll-type kneader.

Examples of the wheel-type kneader include edge runner, multimill, stozmill, wet pan mill, conermill, ringmaler, and the like. Examples of the blade-type kneader include universal stirrer, Henschel mixer, high-speed mixer, planetary mixer, Nauta mixer, and the like. Examples of the ball-type kneader include dry attritor, vibration mill, and the like. Examples of the roll-type kneader include plastomill, and the like. Among these, the wheel-type kneader and blade-type kneader are preferable and edge runner is most preferable.

Examples of the apparatus for wet dispersion after grinding include ball mill, sand mill, attritor, roll mill, bead mill, colloid mill, ultrasonic homogenizer, high-pressure homogenizer, oscillating stirrer, and the like.

The primary particle dispersing element may further comprise additives such as a water-soluble resin and a resin emulsion as necessary.

The ratio of dispersant to be added to the primary particle dispersing element is preferably 10 parts by mass to 100 parts by mass, more preferably 15 parts by mass to 50 parts by mass relative to 100 parts by mass of the coloring pigment.

For the dispersant, surfactants and/or high-molecular dispersants for stabilizing dispersion by adsorbing to the particle surface of the coloring pigment can be used. For the surfactant, anionic surfactants and nonionic surfactants are preferable. For the high-molecular dispersant, styrene-acrylic acid copolymers, polycarboxylates, and the like are preferable.

Further, dispersion stability may be provided by coating a primary particle, which is a white inorganic pigment particle on the surface of which an oil-soluble dye is adsorbed or attached, with a resin having a hydrophilic group to thereby microencapsulate the pigment.

Microencapsulation of a water-insoluble pigment by coating with organic polymers can be performed using any conventional method known in the art. The conventional methods known in the art include chemical processes, physical processes, physicochemical methods, and mechanical processes, specifically, the following methods (1) to (9).
(1) Interfacial polymerization (a method in which two different monomers or two different reactants are separately dissolved as a disperse phase and a continuous phase, and both materials are allowed to react at the interface of both phases to form a wall film),
(2) In-situ polymerization (a method in which a liquid or gaseous monomer and catalyst, or two different reactive materials are supplied from either side of a continuous phase and core particles, and reaction is allowed to occur to form a wall film),
(3) Submerged curing coating (a method in which a drop of polymer solution containing particles of a core material is insolubilized in liquid with a curing agent, etc., and a wall film is formed),
(4) Coacervation (phase separation) (a method in which a polymer dispersion, in which particles of a core material are dispersed, is separated into a coacervate with high polymer concentration (thick phase) and a dilute phase to form a wall film),
(5) Submerged drying (a method in which a liquid, in which a core material is dispersed in a solution of a wall film material, is prepared, this dispersion is put in a solution with which the continuous phase of the dispersion does not mix to form a complex emulsion, and the solvent that dissolves the wall film material is removed gradually to thereby form a wall film),
(6) Melting dispersion cooling (a method in which a wall film material that melts into a liquid state when heated and that becomes solidified at room temperature is utilized, this material is heated and liquefied, particles of a core material are dispersed therein, the particles are made fine particles, and cooled to form a wall film),
(7) Suspension coating in air (a method in which powder particles of a core material are suspended in an air with a fluidized bed, and while suspending in an air stream, a coating liquid of a wall film material is sprayed and mixed to form a wall film),
(8) Spray drying (a method in which a liquid of raw materials for encapsulation is sprayed and is brought into contact with hot air, by which volatile portions are evaporated and dried to form a wall film),
(9) Acid precipitation (a method in which at least a part of an anionic group of organic polymers having anionic group is neutralized with a basic compound, providing solubility to water, and kneaded in an aqueous medium together with a color material; then organic compounds are precipitated by making the mixture neutral or acid with an acidic compound to allow the organic compounds to fix on the color material, then the mixture is neutralized, and the resulting microcapsule is dispersed),
(10) Phase-inversion emulsification (a method in which a mixture, which contains anionic organic polymers capable of dispersing in water and contains a color material, serves as an organic solvent phase, and water is placed in the organic solvent phase, or the organic solvent phase is placed in water.

The organic polymers (resins) to be used as a material constituting a wall film material of a microcapsule is not limited and may be selected accordingly; examples thereof include polyamides, polyurethanes, polyesters, polyureas, epoxy resins, polycarbonates, urea resins, melamine resins, phenolic resins, polysaccharides, gelatin, gum arabic, dextran, casein, proteins, natural rubber, carboxypolymethylene, polyvinyl alcohol, polyvinyl pyrrolidone, polyvinyl acetate, polyvinyl chloride, polyvinylidene chloride, cellulose, ethyl cellulose, methyl cellulose, nitrocellulose, hydroxyethyl cellulose, cellulose acetate, polyethylene, polystyrene, polymers or copolymers of (meth)acrylic acid, polymers or copolymers of (meth)acrylic acid ester, copolymers of (meth) acrylic acid-(meth)acrylic acid ester, copolymers of styrene-(meth)acrylic acid, copolymers of styrene-maleic acid, sodium alginate, fatty acids, paraffin, beeswax, water wax, hardened beef fats, carnauba wax, albumin and the like.

Among these, organic polymers having an anionic group such as a carboxylic group and a sulfonic group can be used. Examples of the nonionic organic polymer include polyvinyl alcohol, polyethylene glycol monomethacrylate, polypropylene glycol monomethacrylate, methoxypolyethylene glycol monomethacrylate, or (co)polymers thereof, and cationic ring-opening polymer of 2-oxazoline. Among these, completely saponified polyvinyl alcohol is most preferable since it has properties such that the water solubility is low and that it is easily soluble in hot water but is hardly soluble in cold water.

The content of the organic polymers constituting a wall film material of a microcapsule is preferably 1% by mass to 20% by mass relative to a water-insoluble color material such as an organic pigment or carbon black. When the surface of pigment is coated with organic polymers, the color-producing property of pigment is reduced. However, the content within the above-mentioned range enables the suppression of such reduction because the rate of content of the organic polymers in the capsule is relatively low. When the content of the organic polymers is less than 1% by mass, encapsulation may not be effective. When the content is more than 20% by mass, the color-producing property of pigment is reduced remarkably. Further, considering other properties, the content of the organic polymers is preferably 5% by mass to 10% by mass relative to a water-insoluble color material.

Thus, a part of color material is substantially exposed without being coated, which enables the suppression of the reduction of color-producing property. Conversely, a part of color material is substantially coated without being exposed. Therefore, the coating given to the pigment can be effective.

The number average molecular mass of the organic polymers for use in the present invention is preferably 2,000 or more in terms of e.g. capsule production. The "substantially exposed" does not mean a partial exposure resulting from a defect such as a pinhole and crack, but means a state where a part of color material is exposed intentionally.

Further, as a colorant, use of organic pigment, which is self-dispersant pigment, or a self-dispersant carbon black is more preferable for the present invention because even if the rate of content of the organic polymers in the capsule is relatively low, the use of self-dispersant organic pigment or elf-dispersant carbon black improves the dispersiveness of pigment, allowing to ensure sufficient preservation stability of ink.

It is preferable that appropriate organic polymers be selected depending on the method for microencapsulation. In the case of interfacial polymerization, polyester resins, polyamide resins, polyurethane resins, polyvinyl pyrrolidone resins, epoxy resins and the like are appropriate. In the case of in-situ polymerization, polymers or copolymers of (meth) acrylic acid ester, copolymers of (meth)acrylic acid-(meth) acrylic acid ester, copolymers of styrene-(meth)acrylic acid, polyvinyl chloride, polyvinylidene chloride, polyamides and the like are appropriate. In the case of submerged curing coating, sodium alginate, polyvinyl alcohol, gelatin, albumin, epoxy resin and the like are appropriate. In the case of coacervation, gelatin, celluloses, casein and the like are appropriate. In addition, in order to obtain a fine and uniform microencapsulated pigment, not mention to the above-mentioned methods, all of the methods for encapsulation conventionally known in the art can be utilized.

When the phase-inversion method or acid precipitation method is selected as the method for microencapsulation, anionic organic polymers are used as the organic polymers forming a wall film material of a microcapsule.

The phase-inversion method is a method in which a composite or complex of anionic organic polymers having a self-dispersing ability or dissolution ability in water, and a color material such as a self-dispersant organic pigment or self-dispersing carbon black, or a mixture of a color material such as a self-dispersant organic pigment or self-dispersing carbon black, a curing agent, and anionic organic polymers, is prepared as an organic solvent phase and, water is poured into the organic solvent phase to microencapsulate the pigment while being self-dispersed (phase-inversion emulsification). Alternatively, the organic solvent phase may be poured into water. In the above-mentioned phase-inversion method, a vehicle or additives for recording liquid may be added to the organic solvent phase to produce a microcapsule, which does not cause any problems. In particular, from the viewpoint that a dispersion for recording liquid can be produced directly, the addition of a liquid medium of recording liquid is preferable.

The acid precipitation is a method in which a part or all of anionic groups in a water-containing cake are neutralized with a basic compound to perform microencapsulation, wherein the water-containing cake is prepared by a process comprising a step in which a part or all of anionic groups of anionic group-containing organic polymers are neutralized with a basic compound, and is kneaded in an aqueous medium together with a color material such as a self-dispersant organic pigment or self-dispersing carbon black; and a step in which pH is adjusted to neutral or acid with an acidic compound, and anionic group-containing organic polymers are precipitated to allow the organic polymer to fix on the pigment. In this way, an aqueous dispersion can be produced that comprises an anionic microencapsulated pigment which is fine and contains a pigment in large amount.

Examples of the solvent for use during the above-mentioned microencapsulation include alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform, and ethylene dichloride; ketones such as acetone, and methyl isobutyl ketone; ethers such as tetrahydrofuran and dioxane; Cellosolves such as methyl Cellosolve and butyl Cellosolve; and the like. A recording liquid of interest that can be used in the present invention is obtained by separating the microcapsule prepared by the above-mentioned method from these solvents by means of centrifugation or filtration, stirring this with water and necessary solvents, and dispersing again.

The recording ink of the present invention comprises a composite pigment particle; a water-soluble solvent; and water, wherein the composite pigment particle is a primary particle (B) coated with a water dispersible resin (A) as a coating resin, wherein the primary particle (B) is a white pigment on the surface of which an oil-soluble dye is adsorbed or attached.

The water dispersible resin (A) as the coating resin is a synthetic resin (a) with an acid value of 50 mgKOH/g to 250 mgKOH/g, and at least a part of an acid group is neutralized with base (b), i.e., an alkaline neutralizing agent.

When the acid value of the synthetic resin (a) is less than 50 mgKOH/g, the water dispersion stability of the obtained dispersing element of composite pigment coated with resin, which composite pigment contains a white inorganic pigment particle on the surface of which an oil-soluble dye is adsorbed or attached, may not be satisfactory. When the acid value of the synthetic resin (a) is more than 250 mgKOH/g, aggregation during neutralization with base and preservation stability of prepared ink may be deteriorated. For inkjet recording, the acid value of the water dispersible resin is preferably 50 mgKOH/g to 250 mgKOH/g, and more preferably 70 mgKOH/g to 250 mgKOH/g.

The acid value of the synthetic resin as the coating resin can be determined by the following numerical formula 1.

Acid value (mgKOH/g)=consumed amount of 1N potassium hydroxide aqueous solution (g)×56.11/ amount of sample (amount of resin)   <Numerical formula 1>

The acid group of the synthetic resin (a) as the coating resin is, for example, a carboxylic group, a sulfonic group, or a sulfinic acid group, and is not particularly limited. Among these, a carboxylic group is a typical one, giving a favorable self-water dispersible resin.

The fixing ability of letters to a recording paper after printing is favorable even if the glass transition temperature of the synthetic resin (a) is less than 50° C.; however, considering further improvement of nozzle clogging and storage stability, the glass transition temperature is preferably 50° C. or more, and 60° C. or more is suitable for inkjet recording.

The synthetic resin (a) as such coating resin is not limited as long as it satisfies the above-mentioned properties, and may be selected accordingly. For example, (meth)acrylic resins, polyester resins that comprise a carboxyl group, and polyurethane resins that comprise a carboxyl group are suitable.

As the (meth)acrylic resin, for example, copolymers are preferable that comprise at least one monomer unit selected from acrylic acid and methacrylic acid; and at least one monomer unit selected from styrene; substituted styrenes such as α-methyl styrene; acrylic acid esters such as acrylic acid methyl ester, acrylic acid ethyl ester, acrylic acid butyl ester, and acrylic acid 2-ethylhexyl ester; and methacrylic acid esters such as methacrylic acid methyl ester, methacrylic acid ethyl ester, methacrylic acid butyl ester, and methacrylic acid 2-ethylhexyl, and, copolymers are more preferable in which as an essential monomer component of self-water dispersible resin (A), styrene monomer, acrylic acid monomer, and methacrylic acid monomer are used. The component ratio of these essential monomer components is preferably 60% by mole to 90% by mole of styrene monomer, 5% by mole to 15% by mole of acrylic acid monomer, and 5% by mole to 25% by mole of methacrylic acid monomer. By this ratio, excellent coloring resin particles for inkjet recording that do not cause nozzle clogging can be obtained.

Also, the range of molecular mass of the resin (a) as the coating resin is not limited and may be selected accordingly, and those having a molecular mass of 1,000 or more to 100,000 or less are preferable. Of course, if a self-water dispersible resin obtained from such resin forms a stable coloring resin particle in combination with an aqueous medium, the range of molecular mass of the resin (a) is not particularly limited to these, and two or more of different resins (a) may be used at the same time by mixing them.

The amount of the water dispersible resin (A) as the coating resin to be used is not particularly defined as long as the effect of the present invention is achieved, but preferably 0.5% by mass to 20% by mass in a recording ink obtained finally.

For the base (b) (alkaline neutralizing agent), in addition to hydroxides of an alkali metal such as sodium hydroxide, potassium hydroxide, and lithium hydroxide, and to basic substances such as ammonia, triethylamine, and morpholine, alcohol amines such as triethanolamine, diethanolamine, and N-methyldiethanolamine can be used. Among these, use of an alcohol amine is most preferable. When the alcohol amine is used, an ink for inkjet recording can be obtained wherein the primary particle (B), which is a white inorganic pigment particle on the surface of which an oil-soluble dye is adsorbed or attached, has more excellent dispersion stability, and wherein nozzle clogging due to particle aggregation resulting from the evaporation of moisture or organic solvent is improved.

The average particle diameter (D50%) of the thus obtained composite pigment particle (encapsulated pigment) in an ink is preferably 150 nm or less, and more preferably 120 nm or less. The lower limit of the average particle diameter is preferably 50 nm or more. When the average particle diameter (D50%) is more than 150 nm, discharge stability is dramatically reduced, and nozzle clogging and misdirection of ink drops may occur easily. In addition, when the average particle diameter (D50%) is 120 nm or less, discharge stability is improved and besides, the saturation of image is also improved.

In this way, resin coating allows a pigment to attach to ink records firmly, by which the scratch resistance of ink records can be improved.

The average particle diameter (D50%) of the composite pigment particle can be measured, for example, with a particle size distribution measuring device (Nanotrac UPA-EX150, manufactured by Nikkiso Co., Ltd.).

—Water-Soluble Solvent—

The recording ink of the present invention uses water as a liquid medium; however, the following water-soluble solvents (may be referred to as "moistening agent") may be used in order to prevent drying of the ink and to improve dispersion stability, etc. These solvents have favorable effects over solubility and prevention of injection-quality defects caused by water evaporation.

The water-soluble solvent is not limited and may be selected accordingly; examples thereof include polyvalent alcohols, polyvalent alcohol alkyl ethers, polyvalent alcohol alyl ethers, nitrogen-containing heterocyclic compounds, amides, amines, sulfur-containing compounds, propylene carbonates, ethylene carbonates, and other water-soluble solvents. These may be used alone or in combination.

Examples of polyvalent alcohols include glycerin, diethylene glycol, 1,3-butanediol, 3-methyl-1,3-butanediol, triethylene glycol, propylene glycol, dipropylene glycol, trimethylol propane, trimethylol ethane, ethylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petriol, and the like.

Examples of polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like.

Examples of polyvalent alcohol aryl ethers include ethylene glycol monophenyl ether, ethylene glycol monobenzyl ether, and the like.

Examples of nitrogen-containing heterocyclic compound include 2-pyrrolidone, N-methyl-2-pyrrolidone, N-hydroxyethyl-2-pyrrolidone, 1,3-dimethyl imidazoledione, ε-caprolactam, γ-butyrolactone, and the like.

Examples of amides include formamide, N-methyl formamide, N,N-dimethyl formamide, and the like.

Examples of amines include monoethanol amine, diethanol amine, triethanol amine, monoethyl amine, diethyl amine, triethyl amine, and the like.

Examples of sulfur-containing compound include dimethyl sulfoxide, sulfolane, thiodiethanol, and the like.

The other water-soluble solvent is preferably one that comprises a sugar. Examples of sugars include monomeric sugars, two sugars, oligosaccharides (including trisaccharide and tetrasaccharide) and polysaccharides. Specific examples include glucose, mannose, fructose, ribose, xylose, arabinose, galactose, maltose, cellobiose, lactose, sucrose, trehalose, malt triose, and the like. The polysaccharides stated here are defined as sugars in a broad sense, which contain matters that broadly exist in the realm of nature such as α-cyclodextrin, cellulose, and the like. Derivatives of these sugars include reducing sugar of the above sugars such as sugar alcohol expressed by General Formula: $HOCH_2 (CHOH)_n CH_2OH$ where "n" represents an integer of 2 to 5, saccharides such as aldonic acid, uronic acid, and the like, amino acid, thio acid, and the like. Of these, sugar alcohol is preferable and specific examples thereof include maltitol, sorbitol, and the like.

Among these water-soluble solvents, glycerin, diethylene glycol, triethylene glycol, 1,3-butanediol and 3-methyl-1,3-butanediol are most preferable in terms of preservation stability and discharge stability.

The ratio of the pigment to the water-soluble solvent significantly affects the discharge stability from head. If the blending quantity of moistening agent is relatively small even though the solid content of pigment is large, water evaporation near the ink meniscus of the nozzle progresses and may result in a discharge failure.

The content of water-soluble solvent in the recording ink is preferably 15% by mass to 40% by mass, and more preferably 20% by mass to 35% by mass. The recording ink having the content within this range provides very favorable results in drying property, preservation test or reliability test. When the content is less than 15% by mass, the ink may have an impaired discharge property and when the content is more than 40% by mass, the ink may have an impaired drying property.

—Penetrating Agent—

The penetrating agent preferably comprises at least one of polyol compounds having a solubility in water at 20° C. of 0.2% by mass to 5.0% by mass. Examples of such polyol compound, aliphatic diol, include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, 2,2,4-trimethyl-1,3-pentanediol and the like. Among these, 2-ethyl-1,3-hexanediol and 2,2,4-trimethyl-1,3-pentanediol are most preferable.

Other penetrating agents that can be used together are not particularly limited as long as they can be adjusted to desired properties, and may be selected accordingly. Examples thereof include alkyl and aryl ethers of polyalcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether, lower alcohols such as ethanol, and the like.

The content of the penetrating agent in the recording ink is preferably 0.1% by mass to 4.0% by mass. When the content is less than 0.1% by mass, quick drying property cannot be obtained, resulting in blurred image in some cases. When the content is more than 4.0% by mass, the dispersion stability of the colorant is impaired, and a nozzle tends to clog. Besides, permeability to a recording medium is increased more than necessary, and the reduction of image density or strike through may occur.

—Surfactant—

The surfactant in the recording ink is preferably a surfactant such that dispersion stability is not impaired depending on the type of colorant and a combination with a water-soluble solvent, and that has low surface tension and a high leveling property. At least one selected from silicone surfactants and fluorosurfactants is suitable. Among these, fluorosurfactants are most preferable.

The number of carbon substituted by fluorine in the fluorosurfactant is preferably 2 to 16, and more preferably 4 to 16. When the number of carbon substituted by fluorine is less than 2, the effect of fluorine may not be obtained, and when it is more than 16, problems in e.g. ink shelf life may be caused.

Examples of the fluorosurfactant include perfluoroalkyl sulfonic acid compounds, perfluoroalkyl carboxylic compounds, perfluoroalkyl phosphate ester compounds, perfluoroalkyl ethylene oxide adducts, polyoxyalkylene ether polymer compounds having a perfluoroalkylether group in a side chain thereof, and the like. Among these, polyoxyalkylene ether polymer compounds having a perfluoroalkylether group in a side chain thereof are most preferable because of low foaming property.

Examples of the perfluoroalkyl sulfonic acid compound include perfluoroalkyl sulfonic acids, perfluoroalkyl sulfonates, and the like.

Examples of the perfluoroalkyl carboxylic compound include perfluoroalkyl carboxylic acids, perfluoroalkyl carboxylates, and the like.

Examples of the perfluoroalkyl phosphate ester compound include perfluoroalkyl phosphate esters, salts of perfluoroalkyl phosphate ester, and the like.

Examples of the polyoxyalkylene ether polymer compound having a perfluoroalkylether group in a side chain thereof include polyoxyalkylene ether polymers having a perfluoroalkylether group in a side chain thereof, sulfuric acid ester salts of polyoxyalkylene ether polymer having a perfluoroalkylether group in a side chain thereof, salts of polyoxyalkylene ether polymer having a perfluoroalkylether group in a side chain thereof, and the like.

Examples of the counter ion of these salts of fluorosurfactant include Li, Na, K, $NH_4$, $NH_3CH_2CH_2OH$, $NH_2(CH_2CH_2OH)_2$, $NH(CH_2CH_2OH)_3$, and the like.

The fluorosurfactant may be either a freshly prepared one or a commercially available one.

Examples of the commercial product include Sarfron S-111, S-112, S-113, S-121, S-131, S-132, S-141, S-145 (all products are manufactured by Asahi Glass Co. Ltd.); Frorard FC-93, FC-95, FC-98, FC-129, FC-135, FC-170C, FC-430, FC-431 (all products are manufactured by Sumitomo 3M Limited); Megafac F-470, F1405, F-474 (all products are manufactured by Dainippon Ink and Chemicals, Incorporated); Zonyl TBS, FSP, FSA, FSN-100, FSN, FSO-100, FSO, FS-300, UR (all products are manufactured by DuPont); FT-110, FT-250, FT-251, FT-400S, FT-150, FT-400SW (all products are manufactured by Neos Company Limited); PF-151N (manufactured by OMNOVA Solutions Inc.); and the like. Among these, FT-110, FT-250, FT-251, FT-400S, FT-150, and FT-400SW manufactured by Neos Company Limited, and PF-151N manufactured by OMNOVA Solutions Inc. are most preferable in terms of favorable printing quality (especially, color-producing property) and remarkable improvement of leveling property on paper.

As a specific example of the fluorosurfactant, those expressed by following Structural Formula are suitable.

(1) Anionic Fluorosurfactant

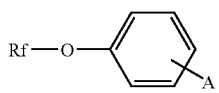

where Rf represents a mixture of fluorine-containing hydrophobic groups expressed by following Structural Formulae; A represents —$SO_3X$, —COOX, or —$PO_3X$ (wherein X is a counter anion and specifically includes a hydrogen atom, Li, Na, K, $NH_4$, $NH_3CH_2CH_2OH$, $NH_2(CH_2CH_2OH)_2$, and $NH(CH_2CH_2OH)_3$);

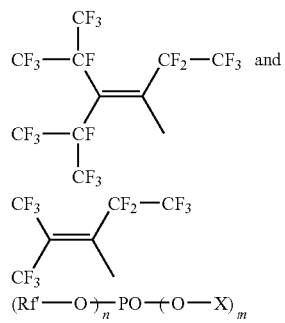

where Rf' represents a fluorine-containing group expressed by following Structural Formulae; X represents the same meaning as mentioned above; n and m represent an integer of 1 or 2 and 2-n, respectively;

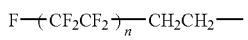

where n represents an integer of 3 to 10;

where Rf' and X represent the same meaning as mentioned above;

where Rf' and X represent the same meaning as mentioned above.

(2) Nonionic Fluorosurfactant

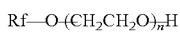

where Rf represents the same meaning as mentioned above; n represents an integer of 5 to 20;

where Rf' represents the same meaning as mentioned above; n represents an integer of 1 to 40.

(3) Ampholytic Fluorosurfactant

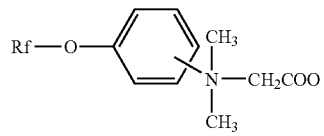

where Rf represents the same meaning as mentioned above.

(4) Oligomeric Fluorosurfactant

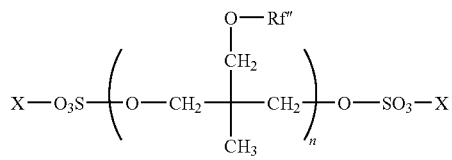

where Rf" represents a fluorine-containing group expressed by following Structural Formulae; n represents an integer of 1 to 10; and X represents the same meaning as mentioned above;

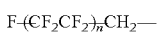

where n represents an integer of 1 to 4;

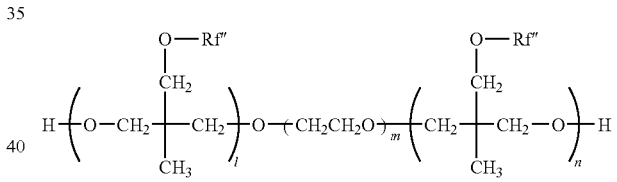

where Rf" represents the same meaning as mentioned above; l, m, and n represent an integer of 0 to 10, respectively.

The silicone surfactant is not limited and may be selected accordingly, and those that do not degrade even at high pH are preferable. Examples thereof include side-chain modified polydimethylsiloxanes, both-ends modified polydimethylsiloxanes, one-end modified polydimethylsiloxanes, modified polydimethylsiloxanes in which both ends of a side chain is modified, and the like. Those having as a modified group a polyoxyethylene group or a polyoxyethylene polyoxypropylene group are most preferable since they exhibit favorable properties as an aqueous surfactant.

Such surfactant may be either a freshly prepared one or a commercially available one.

The commercial products are easily available from BYK-Chemie Japan KK, Shin-Etsu Chemical Co., Ltd., and Dow Corning Toray Silicone Co., Ltd., for example.

The polyether-modified silicone surfactant is not limited and may be selected accordingly; examples thereof include compounds expressed by following Structural Formula in which a polyalkylene oxide structure is introduced into the side chain of a Si portion of dimethylpolysiloxane:

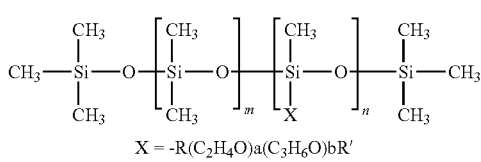

$X = -R(C_2H_4O)a(C_3H_6O)bR'$ where m, n, a, and b represent an integer; and in the X, R and R' represent an alkyl group or an alkylene group.

For the polyether-modified silicone compound, commercial products can be used, and examples thereof include KF-618, KF-642, KF-643 (all products are manufactured by Shin-Etsu Chemical Co., Ltd.), and the like.

In addition to the fluorosurfactants and silicone surfactants, anionic surfactants, nonionic surfactants, amphoteric surfactants, and the like can be used as necessary.

Examples of anionic surfactant include polyoxyethylene alkylether acetate, dodecylbenzene sulfonate, succinate ester sulfonate, sodium laurylate, salts of polyoxyethylene alkylether sulfonate, and the like.

Examples of nonionic surfactant include acetylene glycol surfactants, polyoxyethylene alkylether, polyoxyethylene alkylphenyl ether, polyoxyethylene alkylester, polyoxyethylene sorbitan fatty ester, and the like.

Examples of acetylene glycol surfactants include 2,4,7,9-tetramethyl-5-dithine-4,7-diol, 3,6-dimethyl-4-octine-3,6-diol, 3,5-dimethyl-1-hexane-3-ol, and the like. For the acetylene glycol surfactant, commercial products can be used, and examples thereof include Surfynol 104, 82, 465, 485 or TG by Air Products and Chemicals, Inc.

Examples of the amphoteric surfactant include lauryl aminopropionate, lauryl dimethyl betaine, stearyl dimethyl betaine, lauryl dihydroxyethyl betaine, lauryl dimethylamine oxide, myristyl dimethylamine oxide, stearyl dimethylamine oxide, dihydroxyethyl laurylamine oxide, polyoxyethylene coconut oil alkyldimethylamine oxide, dimethyl alkyl (coconut) betaine, dimethyl lauryl betaine, and the like.

These surfactants are easily available as a commercial product from Nikko Chemicals Co., Ltd., Nihon-Emulsion Co., Ltd., Nippon Shokubai Co., Ltd., Toho Chemical Industry Co., Ltd., Kao Corporation, Adeka Corporation, Lion Corporation, Aoki Oil Industrial Co., Ltd., Sanyo Chemical Industries, Ltd., etc.

The surfactant is not limited to these, and the surfactant may be used alone or in combination. Even when a surfactant used alone is hard to be dissolved in the recording ink, mixture thereof results in solubilization, by which the surfactants can exist stably.

The content of the surfactant in the recording ink is preferably 0.01% by mass to 3.0% by mass and more preferably 0.5% by mass to 2% by mass.

When the content is less than 0.01% by mass, the effect resulting from the addition of surfactant may be lost. When the content is more than 3.0% by mass, permeability to a recording medium is increased more than necessary, and the reduction of image density and bleed-through may occur.

—Water Dispersible Resin—

The water dispersible resin is not limited and may be selected accordingly; examples thereof include condensation-based synthetic resins, addition-based synthetic resins, and natural polymer compounds.

Examples of the condensation-based synthetic resin include polyester resins, polyurethane resins, polyepoxy resins, polyamide resins, polyether resins, silicone resins, and the like. Examples of the addition-based synthetic resin include polyolefin resins, polystyrene resins, polyvinyl alcohol resins, polyvinyl ester resins, polyacrylic acid resins, unsaturated carboxylic acid resins, and the like. Examples of the natural polymer compound include celluloses, rosins, natural rubber, and the like.

The water dispersible resin may be used as a homopolymer, or may be used as a copolymer, i.e., a composite resin, and any emulsion of single-phase type, core shell type, and power feed type may be used.

For the water dispersible resin, those which are self-dispersant due to the hydrophilic group of the resin itself can be used. Even if the resin itself does not have dispersibility, those given dispersibility by surfactant or resin having a hydrophilic group can be used. Among these, ionomers of polyester resin or polyurethane resin, or emulsions of resin particle that are prepared by the emulsion polymerization and suspension polymerization of unsaturated monomer are suitable. In the case of emulsion polymerization of unsaturated monomer, reaction is carried out in the water to which an unsaturated monomer, polymerization initiator, and surfactant, chain transfer agent, chelating agent, pH controlling agent, etc. are added to thereby prepare a resin emulsion. Thus, it is easy to obtain a water dispersible resin, and since the composition of resin can be changed easily, it is easy to make a resin with the intended quality.

Examples of the unsaturated monomer include unsaturated carboxylic acids, (meth)acrylic acid ester monomers, (meth)acrylic acid amide monomers, aromatic vinyl monomers, vinyl cyano compound monomers, vinyl monomers, allyl compound monomers, olefin monomers, diene monomers, oligomers having an unsaturated carbon, and the like. These can be used alone or in combination. Combination of these monomers allows flexible modification of properties, and properties of resin can also be modified by polymerization reaction or graft reaction using an oligomer type polymerization initiator.

Examples of the unsaturated carboxylic acids include acrylic acid, methacrylic acid, itaconic acid, fumaric acid, maleic acid, and the like.

Examples of monofunctional (meth)acrylic acid esters include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloyloxyethyl trimethyl ammonium salt, 3-methacryloyloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, acryloxyethyl trimethyl ammonium salt, and the like.

Examples of multifunctional (meth)acrylic acid esters include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloyloxydiethoxyphenyl)propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyroxyphenyl)propane, 2,2'-bis(4-acryloxydiethoxyphenyl)propane, trimethylolpropane triacrylate, trimethylolethane triacrylate, tetramethylolmethane triacrylate, ditrimethylol tetraacrylate, tetramethylolmethane tetraacrylate, pentaerythritol tetraacrylate, dipentaerythritol hexaacrylate, and the like.

Examples of the (meth)acrylic acid amide monomers include acrylamide, methacrylamide, N,N-dimethylacrylamide, methylenebisacrylamide, 2-acrylamide2-methylpropanesulfonic acid, and the like.

Examples of the aromatic vinyl monomers include styrene, α-methylstyrene, vinyl toluene, 4-t-butylstyrene, chlorostyrene, vinylanisole, vinylnaphthalene, divinylbenzene, and the like.

Examples of the vinyl cyano compound monomers include acrylonitrile, methacrylonitrile, and the like.

Examples of the allyl compound monomers include allyl sulfonic acid or its salts, allylamine, allyl chloride, diallylamine, diallyldimethylammonium salts, and the like.

Examples of the olefin monomers include ethylene, propylene, and the like.

Examples of the diene monomers include butadiene, chloroprene, and the like.

Examples of the vinyl monomers include vinyl acetate, vinylidene chloride, vinyl chloride, vinyl ether, vinyl ketone, vinylpyrrolidone, vinyl sulfonic acid or its salts, vinyltrimethoxysilane, vinyltriethoxysilane, and the like.

Examples of the oligomers having an unsaturated carbon include styrene oligomer with a methacryloyl group, styrene-acrylonitrile oligomer with a methacryloyl group, methylmethacrylate oligomer with a methacryloyl group, dimethylsiloxane oligomer with a methacryloyl group, polyester oligomer with an acryloyl group; and the like.

The water dispersible resin preferably has a pH of 4 to 12 since dispersion destruction or the breakage of molecular chain such as hydrolysis is caused under strong alkaline or acidic condition, and more preferably a pH of 6 to 11 and most preferably a pH of 7 to 9 in terms of miscibility with a water dispersible colorant.

The average particle diameter (D50%) of the water dispersible resin is associated with the viscosity of dispersion. When dispersions have the same composition, the viscosity under the same solid content becomes large with the reduction of particle diameter. In order to avoid excessively high viscosity of prepared ink, the average particle diameter (D50%) of the water dispersible resin is preferably 50 nm or more. The water dispersible resin with an average particle diameter of several tens μm cannot be employed because it is larger than the nozzle opening of inkjet head. Even when the average particle diameter is smaller than the nozzle opening, the presence of particles with a large average particle diameter in the ink deteriorates discharging property. Thus, in order not to impair the discharging property of ink, the average particle diameter (D50%) of the water dispersible resin is more preferably 200 nm or less and most preferably 150 nm or less.

Preferably, the water dispersible resin serves to fix the water dispersible colorant on the paper and forms a film at a room temperature to improve the fixing ability of color material. Therefore, the minimum film-forming temperature (MFT) of the water dispersible resin is preferably 30° C. or less and more preferably. 20° C. or less.

When the glass transition temperature of the water dispersible resin is less than −30° C., the viscidity of the resin film is increased, causing the ink record tacky. Therefore, the glass transition temperature of the water dispersible resin is preferably −30° C. or more.

In the recording ink of the present invention, the water dispersible resin forms a film as the volatile element evaporates to strongly fixate the color material pigment in the recording ink on the recording medium. Therefore it becomes possible to obtain an image of excellent scratch resistance and waterproofness.

The content of the water dispersible resin in the recording ink is, in terms of the solid content, preferably 1% by mass to 30% by mass and more preferably 3% by mass to 24% by mass.

The other element is not limited and may be selected accordingly; examples thereof include pH controlling agent, antiseptic/antifungal agent, chelating agent, rust-preventive agent, antioxidant, ultraviolet absorber, oxygen absorbent, photostabilizer, and the like.

The pH controlling agent is not limited as long as it allows for the control of pH from 7 to 11 without harmful effects to the recording ink to be prepared, and the pH controlling agent may be selected accordingly. Examples thereof include alcohol amines, alkali metal hydroxide, ammonium hydroxide, phosphonium hydroxide, alkali metal carbonate, and the like. If the pH is out of 7 to 11, large amount of materials of inkjet head or ink feeding unit become melted, causing problems such as deterioration, leaks or discharge failure, etc. of the ink.

Examples of alcohol amines include diethanol amine, triethanol amine, 2-amino-2-ethyl-1,3propanediol, and the like.

Examples of alkali metal hydroxide include lithium hydroxide, sodium hydroxide, potassium hydroxide, and the like.

Examples of ammonium hydroxide include ammonium hydroxide, quaternary ammonium hydroxide, quaternary phosphonium hydroxide, and the like.

Examples of alkali metal carbonate include lithium carbonate, sodium carbonate, potassium carbonate, and the like.

Examples of antiseptic/antifungal agent include sodium dehydroacetate, sodium sorbate, 2-pyridinethiol-1-oxide sodium, sodium benzoate, pentachlorophenol sodium, and the like.

Examples of chelating agent include sodium ethylenediamine tetraacetate, sodium nitrilotriacetate, sodium hydroxyethyl ethylenediaminetriacetate, sodium diethylenetriaminepentaacetate, sodium uramil diacetate, and the like.

Examples of rust-preventive agent include acid sulfite, sodium thiosulfate, ammonium thiodiglycolate, diisopropyl ammonium nitrite, pentaerythritol tetranitrate, dicyclohexylammonium nitrite, and the like.

Examples of the antioxidant include phenolic antioxidants (including hindered phenolic antioxidants), amine antioxidants, sulphur antioxidants, phosphorus antioxidants, and the like.

Examples of the phenolic antioxidant (including hindered phenolic antioxidant) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraoxaspiro[5,5]-undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis

[methylene-3-(3',5'-di-tert-butyl-4'-hydroxyphenyl)propionate]methane, and the like.

Examples of the amine antioxidant include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane, and the like.

Examples of the sulphur antioxidant include dilauryl 3,3'-thiodipropionate, distearyl thiodipropionate, laurylstearyl thiodipropionate, dimyristyl 3,3'-thiodipropionate, distearyl β,β'-thiodipropionate, 2-mercaptobenzimidazole, dilauryl sulfide, and the like.

Examples of the phosphorus antioxidant include triphenyl phosphite, octadecyl phosphite, triisodecyl phosphite, trilauryl trithiophosphite, trinonyl phenyl phosphite, and the like.

Examples of the ultraviolet absorber include benzophenone ultraviolet absorber, benzotriazole ultraviolet absorber, salicylate ultraviolet absorber, cyanoacrylate ultraviolet absorber, nickel complex salt ultraviolet absorber, and the like.

Examples of the benzophenone ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, 2,2',4,4'-tetrahydroxybenzophenone, and the like.

Examples of the benzotriazole ultraviolet absorber include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzotriazole, and the like.

Examples of the salicylate ultraviolet absorber include phenylsalicylate, p-tert-butylphenylsalicylate, p-octylphenylsalicylate, and the like.

Examples of the cyanoacrylate ultraviolet absorber include ethyl-2-cyano-3,3'-diphenylacrylate, methyl-2-cyano-3-methyl-3-(p-methoxyphenyl)acrylate, butyl-2-cyano-3-methyl-3-(p-methoxyphenyl)acrylate, and the like.

Examples of the nickel complex salt ultraviolet absorber include nickelbis(octylphenyl)sulfide, 2,2'-thiobis(4-tert-octylphenolate)-n-butylamine nickel (II), 2,2'-thiobis(4-tert-octylphenolate)-2-ethylhexylamine nickel (II), 2,2'-thiobis(4-tert-octylphenolate)triethanolamine nickel (II), and the like.

The recording ink of the present invention is produced by dispersing or dissolving in an aqueous medium a composite pigment particle, a water-soluble solvent, water, and a water dispersible resin, preferably a surfactant, and other elements as necessary, and further by stirring or mixing as necessary. The dispersing can be performed by, for example, a sand mill, homogenizer, ball mill, paint shaker, and ultrasonic disperser. The stirring or mixing can be performed by, for example, a stirrer employing a common stirring blade, magnetic stirrer, and high-speed disperser.

The properties of the recording ink of the present invention are not limited and may be selected accordingly. For example, the viscosity, surface tension, etc. are preferably the range mentioned below.

The recording ink preferably has a viscosity at 25° C. of 4 mPa·s to 20 mPa·s and more preferably 4 mPa·s to 15 mPa·s. When the viscosity is more than 20 mPa·s, it may be difficult to ensure discharge stability. However, such recording ink can be used in case of certain head structure.

The recording ink preferably has a static surface tension at 25° C. of 35 mN/m or less and more preferably 30 mN/m or less. When the surface tension is more than 35 mN/m, the leveling of ink on a recording medium is inhibited, inviting extended drying time.

The color of the recording ink according to the present invention is not limited and may be selected accordingly, and examples include cyan, magenta, yellow, and black. When an ink set containing two or more colors are utilized for recording, multicolor images may be formed; when an ink set containing the whole color is utilized for recording, full-color images may be formed.

The recording ink of the present invention can be favorably employed in any printer equipped with an inkjet head such as piezo inkjet head, thermal inkjet head, or electrostatic inkjet head. In the piezo inkjet head, a diaphragm that forms the wall of an ink flowing passage is deformed using a piezoelectric element as a pressure generating unit for applying pressure on the ink in the ink flowing passage, causing the change in volume in the ink flowing passage to discharge ink drops (See, Japanese Patent Application Publication (JP-B) No. 2-51734). In the thermal inkjet head, ink is heated in the ink flowing passage using a heating resistor, thereby generating bubbles (See, JP-A No. 61-59911). In the electrostatic inkjet head, a diaphragm that forms the wall of an ink flowing passage and an electrode are arranged facing each other, and the diaphragm is deformed by the electrostatic force generated between the diaphragm and electrode, causing the change in volume in the ink flowing passage to discharge ink drops (See, JP-A No. 6-71882).

The recording ink of the present invention can be suitably used for a variety of applications including an ink for inkjet recording, fountain pen, ballpoint pen, felt-tip pen, and fiber-tipped pen, but in particular, can be suitably used in an image recorder (e.g. printer) using an inkjet recording system. For example, the recording ink of the present invention can also be used for printers having the function to promote the fixation of printing by heating recording sheet and the recording ink at 50° C. to 200° C. during printing, or before or after printing, and can be most suitably used for the following ink cartridge, ink record, inkjet recording apparatus, and inkjet recording method of the present invention.

(Ink Cartridge)

The ink cartridge of the present invention comprises the recording ink of the present invention in a container and other members suitably selected accordingly.

The container is not limited and the shape, configuration, size, material and the like of the container may be selected accordingly and the suitable examples include containers comprising ink bag that is formed of aluminum laminated film, resin film, and the like.

Figure 2:
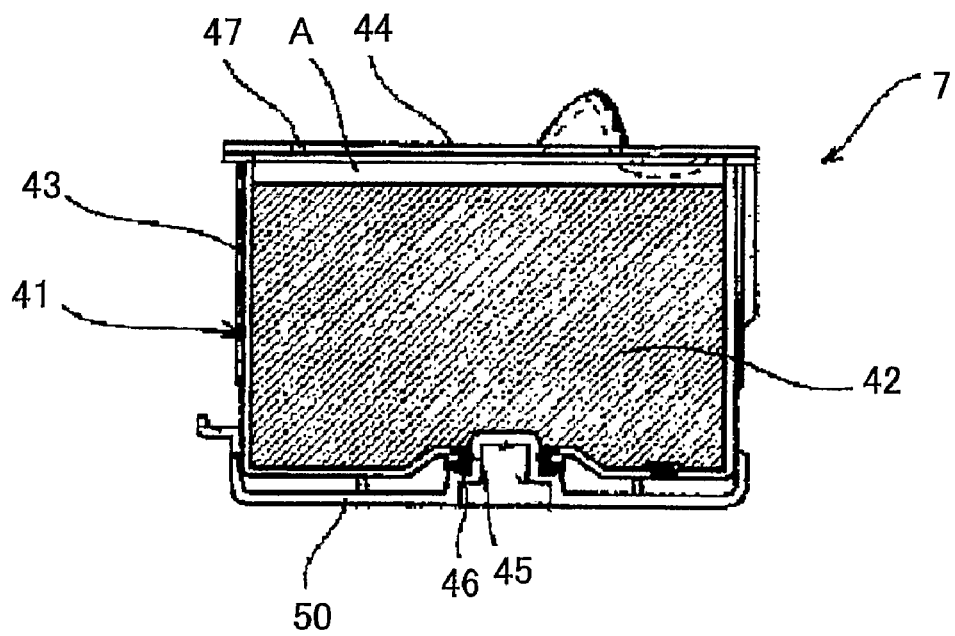
FIG. 2 is a front sectional view of the ink cartridge of FIG. 1.

The ink cartridge is explained referring to the FIGS. 1 and 2. FIG. 1 is an external perspective view of the ink cartridge before being mounted in the inkjet recording apparatus and FIG. 2 is a frontal sectional view of the ink cartridge.

The ink cartridge 7 as shown in FIG. 2 contains the ink absorber 42 into which the required ink is absorbed in the cartridge body 41. The cartridge body 41 is formed by bonding or depositing the bonnet member 44 on the upper wide opening of the case 43 and may be of resin moldings, for example. And the ink absorber 42 is made up with a porous body such as urethane foam and the ink is absorbed after it is compressed and inserted into the cartridge body 41.

The ink feed opening 45, by which the ink is fed into the recording head 6, is formed on the bottom part of the case 43 of cartridge body 41 and the sealing ring 46 is snapped into the inner peripheral side of the ink feed opening 45. The air opening 47 is formed on the bonnet member 44. The cap member 50 is attached onto the cartridge body 41 in order to block off the ink feed opening 45 before being filled and to prevent leakage of the ink caused by the compressive deformation of the case 43 at times such as being filled, transported or pressurized with the wide sidewall when being vacuum-packed.

The air opening 47 as shown in FIG. 1 is sealed by attaching the seal member 55 in a form of a film with oxygen transmission rate of 100 ml/m$^2$ or more to the bonnet member 44. By sealing air opening 47 with the seal member 55 of oxygen transmission rate of 100 ml/m$^2$ or more, and by packaging ink cartridge 7 with a non-porous packaging member such as aluminum laminated film, etc. under reduced pressure, even when being filled with ink or gas is dissolved in the ink due to the air in the space A (shown in FIG. 2) formed between the ink absorber 42 and cartridge body 41, the air inside the ink is discharged into the high-vacuum space between the cartridge body 41 and the packaging member via seal member 55 and deaeration of the ink improves.

The ink cartridge of the present invention comprises the recording ink (ink set) of the present invention and can be used while installed in various inkjet recording apparatuses detachably. In addition, most preferably, the ink cartridge of the present invention can be used while installed detachably in the inkjet recording apparatus of the present invention described below.

(Inkjet Recording Apparatus and Inkjet Recording Method)

The inkjet recording apparatus of the present invention comprises at least an ink drop discharging unit and other units such as stimulation generating unit, controlling unit, and the like as necessary.

The inkjet recording method of the present invention comprises at least an ink drop discharging step and other steps such as stimulation generating step, controlling step, and the like as necessary.

The inkjet recording method of the present invention may be preferably performed by the inkjet recording apparatus of the invention and ink drop discharging step may be preferably performed by ink drop discharging unit. Other steps may be preferably performed by other units respectively.

—Ink Drop Discharging Step and Ink Drop Discharging Unit—

The ink drop discharging step discharges the recording ink by stimulating the recording ink of the present invention to form an image.

The ink drop discharging unit is configured to discharge the recording ink by stimulating the recording ink of the present invention to form an image. The ink drop discharging unit is not particularly limited and may be selected accordingly and examples may be various nozzles for discharging ink.

The stimulation may be generated through above-noted stimulation generating unit, for example. The stimulation is not limited and may be selected accordingly. Examples include heat (temperature), pressure, vibration and light. These may be employed alone or in combination. Among these, heat and pressure are suitable.

Specifically, examples of the stimulation generating unit include heating device, pressure device, piezoelectric element, vibration generating device, ultrasonic generating device, light, and the like, and in particular, piezoelectric actuator such as piezoelectric element, thermal actuator based on phase-change of the film between liquid and vapor using electothermal transducer such as heating resistor, shape memory alloy actuator based on phase-change depending on the temperature, electrostatic actuator based on electrostatic power, and the like are exemplified.

The aspect of recording ink discharge is not limited and differs depending on the stimulation. If the stimulation is generated by "heat", such process is exemplified as thermal energy corresponding to the recording signal is applied on the recording ink in the recording head by using a thermal head, then bubbles are generated in the recording ink through thermal energy, thereby injecting the recording ink from the nozzle of the recording head in a form of ink drops owing to the bubble pressure. Alternatively, if the stimulation is generated by "pressure", such process is exemplified as a voltage is applied to a piezoelectric element adhered on so-called pressure room in the ink flowing passage of the recording head, causing the piezoelectric element to be deflected, thereby reducing the volume of the pressure room, and injecting the recording ink from the nozzle of the recording head in a form of ink drops.

The ink drops of the recording ink discharged is preferably 3 pl to 40 pl in size at an injection speed of 5 m/s to 20 m/s, drive frequency of 1 kHz or more and resolution of 300 dpi or more.

In addition, the controlling unit is not limited as long as it can control the individual unit efficiently and may be selected accordingly. Examples thereof include equipments such as sequencer and computer.

Next, referring to drawings, a method for forming an image on a recording medium will be described, wherein the ink cartridge that contains the recording ink of the present invention is attached to an inkjet printer, and the recording ink is discharged as ink drops from a fine discharge opening to form the image.

Figure 3:
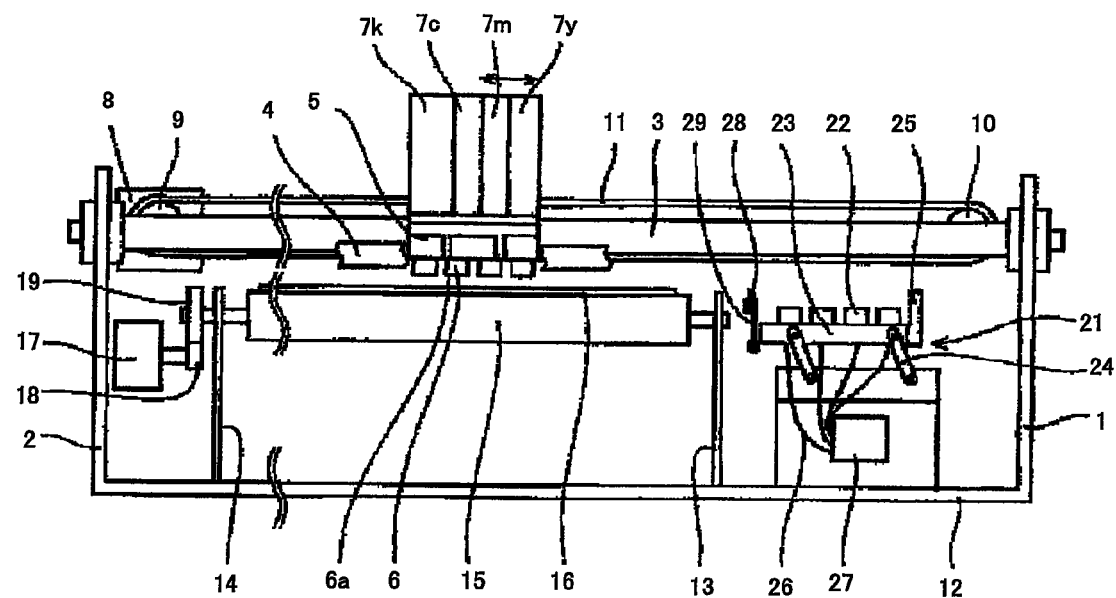
FIG. 3 is an outlined front view of an exemplary serial-type inkjet recording apparatus equipped with the ink cartridge which contains the ink to which the present invention is applied.

FIG. 3 is an outlined front view of an exemplary serial-type inkjet recording apparatus equipped with the ink cartridge which has a recording ink compartment containing the recording ink of the present invention.

In the mechanical section of the inkjet recording apparatus, the main guide rod 3 and the sub-guide rod 4 are bridged laterally between the side panels 1 and 2 in almost horizontal position and the carriage unit 5 is supported by the main guide rod 3 and the sub guide rod 4 in the main scanning direction as slidable.

Each four of the head 6 which discharges yellow (Y) ink, magenta (M) ink, cyan (C) ink and black (Bk) ink respectively, is mounted on the carriage unit 5 with each discharging side (nozzle side) 6a facing downward. The four ink cartridges 7y, 7m, 7c and 7k as ink feeders for each color are mounted on the upper side of the head 6, the carriage unit 5 as exchangeable.

The carriage unit 5 is then attached to the timing belt 11 which is extended between the drive pulley (drive timing pulley) 9 rotated by the main scanning motor 8 and the sub-drive pulley (idle pulley) 10 to control the drive of the main scanning motor 8 and the carriage 5, that is, four head 6 is moved into the main scanning direction.

Furthermore, by setting up the sub-frames 13 and 14 on the floor plate 12 which hooks up the side plates 1 and 2, the transport roller 15, by which the paper 16 is transported in the sub-scanning direction crossing the main scanning direction at a right angle, is placed rotatably between the sub-frames 13 and 14. And the sub-scanning motor 17 is placed on the side of the sub-frame 14 and the gear 18 is fixed on the rotation axis of the sub-scanning motor 17 and the gear 19 is fixed onto the axis of the transport roller 15 in order to transmit the rotation of the sub-scanning motor 17 to the transport roller 15.

Further, the restorative system for liability 21 of the head 6 (hereafter referred to as "sub-system") is placed between the side plate 1 and the sub-frame 12. In the sub-system 21, the holder 23, which keeps the four cap units 22 for capping the discharging side of each head 6, is kept by the link member 24 as swingable and the carriage unit 5 touches the catching part 25 mounted on the holder 23 by the movement in the main scanning direction. The holder 23 is lifted up following with the movement of the carriage unit 5 and the discharging side 6a of inkjet head 6 is capped with the cap unit 22 and the carriage unit 5 is moved further into the printing area. The holder 23 is then lifted down with the movement of the carriage unit 5 and the cap unit 22 is separated from the discharging side 6a of the inkjet head 6.

The cap unit 22 is connected with the suction pump 27 via the suction tube 26 while simultaneously being communicated with air via air open tube and air open bulb by forming an air opening. The suction pump 27 discharges suctioned waste solution into the waste solution storage tank which is not shown in figures via drain tubes, etc.

Further, the wiper blade 28, as a wiping unit which may be of fabric, foaming or elastic members such as rubber, and the like with which the discharging side 6a of the inkjet head 6 is wiped, is mounted onto the blade arm 29 on the side of the holder 23. The blade arm 29 is set up as swingable and it is swinged by the rotation of the cam that is rotated by the drive unit which is not shown in figures.

Figure 4:
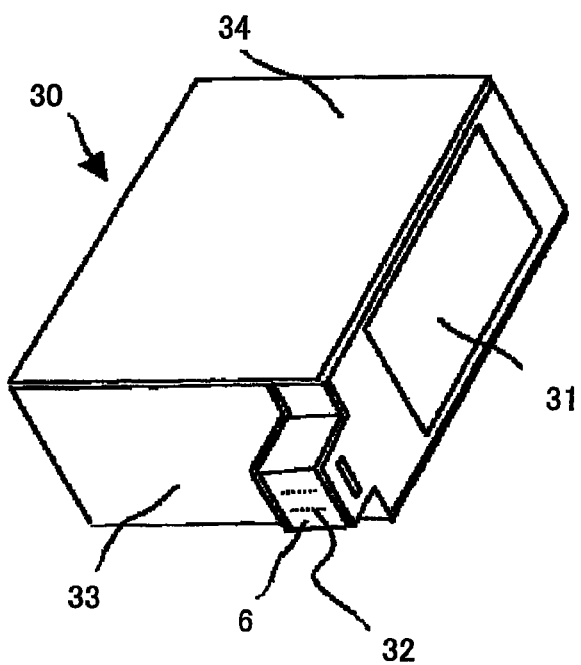
FIG. 4 is an external perspective view of an exemplary recording unit unified with a recording head.

The ink containing part wherein the ink of the present invention is contained and the recording cartridge (recording unit) equipped with a head by which the ink drops are discharged referring to the configuration example shown in FIG. 4. The recording unit will be described below.

The recording unit 30 is a serial type, and the main part is lined up with the head 6, ink tank 33 in which the ink fed to the inkjet head 6 is contained, and the cap member 34 by which inside the ink tank 33 is sealed.

A lot of nozzles 32 for discharging ink are formed on the head 6 of the recording unit 30. The ink is led from the ink tank 33 to the common liquid chamber (not shown in figures) via ink feeding tube (omitted in figures) and discharged from the nozzle 32 corresponding to the electric signals that are entered by the electrode 31 from the recording apparatus body. This type of recording unit 30 is structurally favorable for the affordable head powered by thermal energy which is referred to as thermal-type or bubble-type. Since the ink with excellent permeability is used in the recording method such as bubble or thermal type, etc., the wetting ability of the ink of the present invention to the thermal element is improved, thereby ink discharge stability and frequency stability can be obtained and it is highly safe and is extremely suitable.

Although examples are only applied to the serial type (shuttle type) inkjet recording apparatus hereinbefore, the ink of the present invention is also applicable to the line type inkjet recording apparatus equipped with a line head, wherein the nozzles are aligned in a voluntary order such as zigzag, etc. and the density is concentrated to the degree as same as or a fraction of the image resolution and aligned wider than a recording medium.

The inkjet recording apparatus and inkjet recording method of the present invention are applicable to a variety of recording using an inkjet recording method, and most suitably applicable to, for example, printers for inkjet recording, facsimile apparatuses, copying apparatuses, printer/fax/ copier all-in-one devices, etc.

(Ink Record)

An ink record recorded by the ink jet recording apparatus and inkjet recording method of the present invention is the ink record of the present invention. The ink record of the present invention comprises an image formed on a recording medium by the recording ink of the present invention.

The recording medium is not limited and may be selected accordingly and examples thereof include regular paper, gloss paper, special paper, cloth, film, overhead projection (OHP) sheet, and the like. These may be used alone or in combination.

The ink record may suitably be used for various purposes as a material on which an image of high-quality and excellent stability with no blur is recorded.

The present invention can solve conventional problems and can provide recording ink which excels in discharge stability and preservation stability, which has good image retention capabilities such as scratch resistance, waterproofness and light stability, etc., which makes it possible to obtain a high quality image that excels in color reproducibility of color image, and which is suitable for inkjet recording; ink cartridge, inkjet recording method, and inkjet recording apparatus that utilize the recording ink respectively.

EXAMPLE

The examples of the present invention are explained as follow; however, these are not to be construed as limiting the scope of the present invention. All percentages are by mass unless indicated otherwise.

Preparation Example 1

Preparation of Dispersing Element a of Composite Pigment Coated with Resin

<Production of Primary Particle I>

30 g of ultrafine zinc oxide powder (FINEX-50, manufactured by Sakai Chemical Industry Co., Ltd., form of particle: powder, average particle diameter=0.02 μm) was added to 100 g of methyl ethyl ketone solution of 5% C.I. Disperse Violet 31, and stirred for one hour using a stirrer. Next, methyl ethyl ketone was removed with a rotary evaporator, and further, methyl ethyl ketone was completely removed with a desiccator under a reduced pressure to obtain a composite solid. This composite solid was ground with a mortar to prepare a primary particle I.

<Mill Base Formula>

Primary particle I of composite pigment . . . 15 g

Takelac W5025 (manufactured by Mitsui Takeda Chemical Co., Ltd., polyurethane resin, acid value 70 mgKOH/g, solid parts of 30%) . . . 15 g Deionized water . . . 70 g <Kneading Process>

Above composite pigment was mixed and moistened to a satisfactory extent. Zirconia beads of 0.5 mm diameter was filled into a kneading apparatus, DYNO-Mill KDL A by W. A. Bachofen of Switzerland, and knead-mixed at 2,000 rpm for 60 minutes to obtain a mill base with an average particle diameter (D50%) of 70 nm.

<Acid Precipitation Process>

Acid precipitation was performed by dropping 1N hydrochloric acid while stirring the obtained mill base to obtain a mill base in paste form.

<Water Washing-Alkalization Process>

To the obtained mill base, was added 400 g of deionized water and stirred well, separated into a pigment paste and water using a centrifugal machine, and the supernatant solution was removed. This operation was repeated several times to obtain 100 g of mill base with a pH of 5.5. To this, a basic compound, 2-amino-2-methyl-1,3-propanediol, was added to adjust pH to 8.2.

<Re-Kneading Process>

Again, zirconia beads of 0.5 mm diameter was filled into DYNO-Mill KDL A by W. A. Bachofen of Switzerland, and knead-mixed at 2,000 rpm for 10 minutes. A mill base was taken out and the measured average particle diameter (D50%) thereof was 114 nm.

<Bulky Particle Removing Process>

By removing bulky particles of 0.8 μm or more using 0.8 μm membrane filter (manufactured by ADVANTEC), 80 g of dispersing element A of composite pigment coated with resin having an average particle diameter (D50%) of 86 nm and a pigment concentration of 15%. The average particle diameter (D50%) was measured with a particle size distribution measuring device (Nanotrac UPA-EX150, manufactured by Nikkiso Co., Ltd.).

Preparation Example 2

Preparation of Dispersing Element B of Composite Pigment Coated with Resin

<Production of Primary Particle II>

30 g of ultrafine titanium oxide powder (TTO-55, manufactured by Ishihara Sangyo Kaisha, Ltd., form of particle: granular, average particle diameter=0.01 μm to 0.03 μm) and 10 g of C.I. Solvent Red 207 powder were put into a 250 ml zirconia pot, 50 zirconia balls with a diameter of 10 mm and 20 zirconia balls with a diameter of 20 mm were further put thereinto, and ground and mixed with a planetary ball mill at 400 rpm and for 48 hours.

<Mill Base Formula>

Primary particle II of composite pigment . . . 15 g
ARUFON UC-3000 (manufactured by Toagosei Co., Ltd., acrylic resin, acid value 89 mgKOH/g, solid parts of 100%) . . . 7.5 g
Deionized water . . . 77.5 g <Kneading Process>

First, an acrylic resin was dispersed in deionized water, equivalent amount of 1N lithium hydroxide aqueous solution was dropped, and stirred under heating to dissolve the resin. Next, above composite pigment was mixed and moistened to a satisfactory extent. Zirconia beads of 0.5 mm diameter was filled into a kneading apparatus, DYNO-Mill KDL A by W. A. Bachofen of Switzerland, and knead-mixed at 2,000 rpm for 60 minutes to obtain a mill base with an average particle diameter (D50%) of 45 nm.

<Acid Precipitation Process>

Acid precipitation was performed by dropping 1N hydrochloric acid while stirring the obtained mill base to obtain a mill base in paste form.

<Water Washing-Alkalization Process>

To the obtained mill base, was added 400 g of deionized water and stirred well, separated into a pigment paste and water using a centrifugal machine, and the supernatant solution was removed. This operation was repeated several times to obtain 100 g of mill base with a pH of 5.7. To this, a basic compound, 2-amino-2-methyl-1,3-propanediol, was added to adjust pH to 8.4.

<Re-Kneading Process>

Again, zirconia beads of 0.5 mm diameter was filled into DYNO-Mill KDL A by W. A. Bachofen of Switzerland, and knead-mixed at 2,000 rpm for 10 minutes. A mill base was taken out and the measured average particle diameter (D50%) thereof was 86 nm.

<Bulky Particle Removing Process>

By removing bulky particles of 0.8 μm or more using 0.8 μm membrane filter (manufactured by ADVANTEC), 82 g of dispersing element B of composite pigment coated with resin having an average particle diameter (D50%) of 65 nm and a pigment concentration of 15%. The average particle diameter (D50%) was measured with a particle size distribution measuring device (Nanotrac UPA-EX150, manufactured by Nikkiso Co., Ltd.).

Preparation Example 3

Preparation of Dispersing Element C of Composite Pigment Coated with Resin

<Production of Primary Particle III>

30 g of white pearl mica powder (Magnapearl 13000, available from Takara Tsusho Co., Ltd., form of particle: granular, average particle diameter=2 μm to 10 μm) and 5 g of C.I. Solvent Blue 87 powder were put into a 250 ml zirconia pot, 50 zirconia balls with a diameter of 10 mm and 20 zirconia balls with a diameter of 20 mm were further put thereinto, and ground and mixed with a planetary ball mill at 400 rpm and for 96 hours.

<Mill Base Formula>

Primary particle III of composite pigment . . . 15 g
ARUFON UC-3920 (manufactured by Toagosei Co., Ltd., styrene-acrylic resin, acid value=243 mgKOH/g, solid parts of =100%) . . . 7.5 g
Deionized water . . . 77.5 g <Kneading Process>

First, a styrene-acrylic resin was dispersed in deionized water, equivalent amount of 1N lithium hydroxide aqueous solution was dropped, and stirred under heating to dissolve the resin. Next, above composite pigment was mixed and moistened to a satisfactory extent. Zirconia beads of 0.5 mm diameter was filled into a kneading apparatus, DYNO-Mill KDL A by W. A. Bachofen of Switzerland, and knead-mixed at 2,000 rpm for 60 minutes to obtain a mill base with an average particle diameter (D50%) of 145 nm.

<Acid Precipitation Process>

Acid precipitation was performed by dropping 1N hydrochloric acid while stirring the obtained mill base to obtain a mill base in paste form.

<Water Washing-Alkalization Process>

To the obtained mill base, was added 400 g of deionized water and stirred well, separated into a pigment paste and water using a centrifugal machine, and the supernatant solution was removed. This operation was repeated several times to obtain 100 g of mill base with a pH of 5.7. To this, a basic compound, 2-amino-2-methyl-1,3-propanediol, was added to adjust pH to 8.4.

<Re-Kneading Process>

Again, zirconia beads of 0.5 mm diameter was filled into DYNO-Mill KDL A by W. A. Bachofen of Switzerland, and knead-mixed at 2,000 rpm for 10 minutes. A mill base was taken out and the measured average particle diameter (D50%) thereof was 184 nm.

<Bulky Particle Removing Process>

By removing bulky particles of 0.8 μm or more using 0.8 μm membrane filter (manufactured by ADVANTEC), 75 g of dispersing element C of composite pigment coated with resin having an average particle diameter (D50%) of 142 nm and a pigment concentration of 15%. The average particle diameter (D50%) was measured with a particle size distribution measuring device (Nanotrac UPA-EX150, manufactured by Nikkiso Co., Ltd.).

Preparation Example 4

Preparation of Dispersing Element D of Composite Pigment Coated with Resin

<Production of Primary Particle IV>

30 g of ultrafine barium sulphate powder (BF-1H, manufactured by Sakai Chemical Industry Co., Ltd., form of particle: granular, average particle diameter=0.1 μm) was added to 100 g of toluene solution of 5% C.I. Solvent Blue 36, and stirred for one hour using a stirrer. Next, toluene was removed with a rotary evaporator, and then, toluene was completely removed with a desiccator under a reduced pressure to obtain a composite solid. This composite solid was ground with a mortar to prepare a primary particle IV.

<Mill Base Formula>
  Primary particle IV of composite pigment . . . 15 g
  Nichigo POLYESTER W-0030 (manufactured by Nippon Synthetic Chemical Industry Co., Ltd., polyester resin, acid value 100 mgKOH/g, solid parts of 30%) . . . 20 g
  Deionized water . . . 65 g <Kneading Process>
Above composite pigment was mixed and moistened to a satisfactory extent. Zirconia beads of 0.5 mm diameter was filled into a kneading apparatus, DYNO-Mill KDL A by W. A. Bachofen of Switzerland, and knead-mixed at 2,000 rpm for 60 minutes to obtain a mill base with an average particle diameter (D50%) of 125 nm.

<Acid Precipitation Process>
Acid precipitation was performed by dropping 1N hydrochloric acid while stirring the obtained mill base to obtain a mill base in paste form.

<Water Washing-Alkalization Process>
To the obtained mill base, was added 400 g of deionized water and stirred well, separated into a pigment paste and water using a centrifugal machine, and the supernatant solution was removed. This operation was repeated several times to obtain 100 g of mill base with a pH of 5.6. To this, a basic compound, 2-amino-2-methyl-1,3-propanediol, was added to adjust pH to 8.3.

<Re-Kneading Process>
Again, zirconia beads of 0.5 mm diameter was filled into DYNO-Mill KDL A by W. A. Bachofen of Switzerland, and knead-mixed at 2,000 rpm for 10 minutes. A mill base was taken out and the measured average particle diameter (D50%) thereof was 163 nm.

<Bulky Particle Removing Process>
By removing bulky particles of 0.8 μm or more using 0.8 μm membrane filter (manufactured by ADVANTEC), 70 g of dispersing element D of composite pigment coated with resin having an average particle diameter (D50%) of 135 nm and a pigment concentration of 15%. The average particle diameter (D50%) was measured with a particle size distribution measuring device (Nanotrac UPA-EX150, manufactured by Nikkiso Co., Ltd.).

Preparation Example 5

Preparation of Dispersing Element E of Composite Pigment Coated with Resin

<Production of Primary Particle V>
30 g of colloidal silica powder (Quartron PL-1, manufactured by Fuso Chemical Co., Ltd., form of particle: granular, average particle diameter=15 nm) was added to 100 g of toluene solution of 5% C.I. Solvent Yellow 16, and stirred for one hour using a stirrer. Next, toluene was removed with a rotary evaporator, and further, toluene was completely removed with a desiccator under a reduced pressure to obtain a composite solid. This composite solid was ground with a mortar to prepare a primary particle V.

<Mill Base Formula>
  Primary particle V of composite pigment . . . 15 g
  JC-05 (manufactured by Seiko PMC Corporation, styrene-acrylic resin, acid value 170 mgKOH/g, solid parts of 20%) . . . 30 g
  Deionized water . . . 55 g <Kneading Process>
Above composite pigment was mixed and moistened to a satisfactory extent. Zirconia beads of 0.5 mm diameter was filled into a kneading apparatus, DYNO-Mill KDL A by W. A. Bachofen of Switzerland, and knead-mixed at 2,000 rpm for 60 minutes to obtain a mill base with an average particle diameter (D50%) of 57 nm.

<Acid Precipitation Process>
Acid precipitation was performed by dropping 1N hydrochloric acid while stirring the obtained mill base to obtain a mill base in paste form.

<Water Washing-Alkalization Process>
To the obtained mill base, was added 400 g of deionized water and stirred well, separated into a pigment paste and water using a centrifugal machine, and the supernatant solution was removed. This operation was repeated several times to obtain 100 g of mill base with a pH of 5.6. To this, a basic compound, 2-amino-2-methyl-1,3-propanediol, was added to adjust pH to 8.3.

<Re-Kneading Process>
Again, zirconia beads of 0.5 mm diameter was filled into DYNO-Mill KDL A by W. A. Bachofen of Switzerland, and knead-mixed at 2,000 rpm for 10 minutes. A mill base was taken out and the measured average particle diameter (D50%) thereof was 86 nm.

<Bulky Particle Removing Process>
By removing bulky particles of 0.8 μm or more using 0.8 μm membrane filter (manufactured by ADVANTEC), 85 g of dispersing element E of composite pigment coated with resin having an average particle diameter (D50%) of 73 nm and a pigment concentration of 15%. The average particle diameter (D50%) was measured with a particle size distribution measuring device (Nanotrac UPA-EX150, manufactured by Nikkiso Co., Ltd.).

Preparation Example 6

Preparation of Pigment Dispersing Element A

—Surfactant Pigment Dispersing Element—

<Mill Base Formula>
  Phthalocyanine C.I. Pigment Blue 15:3 (ECB-301, manufactured by Dainichiseika Color & Chemicals Mfg. Co., Ltd.) . . . 15 g
  Polyoxyethylene lauryl ether <DKS NL-180> . . . 5 g (nonionic surfactant, manufactured by Dai-Ichi Kogyo Seiyaku Co., Ltd., HLB value: 16.2)
  Deionized water . . . 80 g <Kneading Process>
Above composite pigment was mixed and moistened to a satisfactory extent. Zirconia beads of 0.5 mm diameter was filled into a kneading apparatus, DYNO-Mill KDL A by W. A. Bachofen of Switzerland, and knead-mixed at 2,000 rpm for 60 minutes to obtain a pigment dispersing element A with an average particle diameter (D50%) of 95 nm. The average particle diameter (D50%) was measured with a particle size distribution measuring device (Nanotrac UPA-EX150, manufactured by Nikkiso Co., Ltd.).

Preparation Example 7

Preparation of Dispersing Element F of Composite Pigment Coated with Resin

<Production of Primary Particle VI>
30 g of ultrafine zinc oxide powder (FINEX-50, manufactured by Sakai Chemical Industry Co., Ltd., form of particle: powder, average particle diameter=0.02 μm) was added to 100 g of methyl ethyl ketone solution of 5% C.I. Disperse Violet 31, and stirred for one hour using a stirrer. Next, methyl ethyl ketone was removed with a rotary evaporator, and further, methyl ethyl ketone was completely removed with a desiccator under a reduced pressure to obtain a composite solid. This composite solid was ground with a mortar to prepare a primary particle VI.

<Mill Base Formula>
  Primary particle VI of composite pigment . . . 15 g
  Takelac W5025 (manufactured by Mitsui Takeda Chemical Co., Ltd., polyurethane resin, acid value 70 mgKOH/g, solid parts of 30%) . . . 15 g
  Deionized water . . . 70 g <Kneading Process>
Above composite pigment was mixed and moistened to a satisfactory extent. Zirconia beads of 0.5 mm diameter was filled into a kneading apparatus, DYNO-Mill KDLA by W. A. Bachofen of Switzerland, and knead-mixed at 2,000 rpm for 30 minutes to obtain a mill base with an average particle diameter (D50%) of 132 nm.

<Acid Precipitation Process>
Acid precipitation was performed by dropping 1N hydrochloric acid while stirring the obtained mill base to obtain a mill base in paste form.

<Water Washing-Alkalization Process>
To the obtained mill base, was added 400 g of deionized water and stirred well, separated into a pigment paste and water using a centrifugal machine, and the supernatant solution was removed. This operation was repeated several times to obtain 100 g of mill base with a pH of 5.5. To this, a basic compound, 2-amino-2-methyl-1,3-propanediol, was added to adjust pH to 8.2.

<Re-kneading Process>
Again, zirconia beads of 0.5 mm diameter was filled into DYNO-Mill KDLA by W. A. Bachofen of Switzerland, and knead-mixed at 2,000 rpm for 10 minutes. A mill base was taken out and the measured average particle diameter (D50%) thereof was 179 nm.

<Bulky Particle Removing Process>
By removing bulky particles of 0.8 μm or more using 0.8 μm membrane filter (manufactured by ADVANTEC), 80 g of dispersing element F of composite pigment coated with resin having an average particle diameter (D50%) of 166 nm and a pigment concentration of 15%. The average particle diameter (D50%) was measured with a particle size distribution measuring device (Nanotrac UPA-EX150, manufactured by Nikkiso Co., Ltd.).

Preparation Example 8

Preparation of Dispersing Element G of Composite Pigment Coated with Resin

<Production of Primary Particle VIII>
30 g of ultrafine barium sulphate powder (BF-1H, manufactured by Sakai Chemical Industry Co., Ltd., form of particle: granular, average particle diameter=0.1 μm) was added to 100 g of toluene solution of 5% C.I. Solvent Blue 36, and stirred for one hour using a stirrer. Next, toluene was removed with a rotary evaporator, and then, toluene was completely removed with a desiccator under a reduced pressure to obtain a composite solid. This composite solid was ground with a mortar to prepare a primary particle VIII.

<Mill Base Formula>
  Primary particle VIII of composite pigment . . . 15 g
  Plascoat RZ-142 (manufactured by Goo Chemical Co., Ltd., polyester resin, acid value from 30 mgKOH/g to 50 mgKOH/g, solid parts of 25% by mass) . . . 24 g
  Deionized water . . . 65 g <Kneading Process>
Above composite pigment was mixed and moistened to a satisfactory extent. Zirconia beads of 0.5 mm diameter was filled into a kneading apparatus, DYNO-Mill KDLA by W. A. Bachofen of Switzerland, and knead-mixed at 2,000 rpm for 60 minutes to obtain a mill base with an average particle diameter (D50%) of 180 nm.

<Acid Precipitation Process>
Acid precipitation was performed by dropping 1N hydrochloric acid while stirring the obtained mill base to obtain a mill base in paste form.

<Water Washing-Alkalization Process>
To the obtained mill base, was added 400 g of deionized water and stirred well, separated into a pigment paste and water using a centrifugal machine, and the supernatant solution was removed. This operation was repeated several times to obtain 100 g of mill base with a pH of 5.6. To this, a basic compound, 2-amino-2-methyl-1,3-propanediol, was added to adjust pH to 8.5.

<Re-Kneading Process>
Again, zirconia beads of 0.5 mm diameter was filled into DYNO-Mill KDL A by W. A. Bachofen of Switzerland, and knead-mixed at 2,000 rpm for 10 minutes. A mill base was taken out and the particle diameter was measured, however, the average particle diameter could not be determined due to aggregation.

Examples 1 to 7 and Comparative Examples 1 and 2

—Preparation of Recording Ink—

A recording ink was produced according to the following procedure. Initially, the water-soluble solvent, penetrating agent, surfactant, and water, shown in Table 1 below, were mixed, stirred for one hour to mix the mixture uniformly. To this mixture, was added a dispersing element of composite pigment coated with resin and stirred for one hour, and a pigment dispersing element and antifoaming agent were added and stirred for one hour. This dispersion was filtered under pressure with a cellulose acetate membrane filter of 0.8 μm average pore diameter, and bulky particles and dust were removed to prepare a recording ink to be used for evaluation. In Table 1, the numerical values of each element represent % by mass.

TABLE 1

| | | Example | | | | | | | Comparative Example | |
|---|---|---|---|---|---|---|---|---|---|---|
| | Element (% by mass) | 1 | 2 | 3 | 4 | 5 | 6 | 7 | 1 | 2 |
| Pigment dispersing element (Color material) | Dispersing element A of composite pigment coated with resin | 53.3 | | | | | | | | |
| | Dispersing element B of composite pigment coated with resin | | 53.3 | | | | | | | |
| | Dispersing element C of composite pigment coated with resin | | | | 40.0 | | | 40.0 | | |

TABLE 1-continued

| | Element (% by mass) | Example 1 | Example 2 | Example 3 | Example 4 | Example 5 | Example 6 | Example 7 | Comparative Example 1 | Comparative Example 2 |
|---|---|---|---|---|---|---|---|---|---|---|
| | Dispersing element D of composite pigment coated with resin | | | | 40.0 | | | | | |
| | Dispersing element E of composite pigment coated with resin | | | | | 40.0 | | | | |
| | Dispersing element F of composite pigment coated with resin | | | | | | | 53.3 | | |
| | Pigment dispersing element A | | | | | | | | 40.0 | |
| | C.I. Acid Red 52(dye) | | | | | | | | | 3.0 |
| Water dispersible resin | Acrylic silicone emulsion | 10 | | 15 | | | 10 | | | |
| | Acrylic emulsion | | | | | 10 | | | | |
| | Polyurethane emulsion | | 10 | | | | | | | |
| | Polyester emulsion | | | | 7.5 | | | | | |
| Water-soluble solvent | 3-methyl-1,3-butanediol | 21 | 21 | | | | | 21 | | |
| | Triethylene glycol | | | 8 | | | 7.5 | | | 7.5 |
| | 1,3-butanediol | | | 13 | 21 | 21 | 15 | | 21 | 7.5 |
| | N-methyl-2-pyrrolidone | | | 1 | | | | | | |
| | Glycerin | 7 | 7 | 7 | 7 | 7 | 7.5 | 7 | 7 | 7.5 |
| Penetrating agent | Octanediol | 2 | 2 | 2 | 2 | | 1 | 2 | | 1 |
| | 1,2-hexanediol | | | | | 2 | 1 | | 2 | 1 |
| Surfactant | PolyFox PF-151N | | | 2 | | | | | | |
| | Zonyl FS-300 | 2.5 | 2.5 | | 2.5 | 1.5 | | 2.5 | | |
| | Softanol EP-5035 | | | | | 1 | | | | |
| | DKS NL-180 | | | | | | 1.5 | | 2 | 1.5 |
| Fungicide | Proxel GXL | 0.05 | 0.05 | 0.05 | 0.05 | 0.05 | 0.05 | 0.05 | 0.05 | 0.05 |
| Antifoaming agent | Silicone antifoaming agent KM-72F | 0.1 | 0.1 | 0.1 | 0.1 | 0.1 | 0.1 | 0.1 | 0.1 | 0.1 |
| pH controlling agent | Trifithanol amine | 1 | 1 | 1 | 1 | 1 | 1 | 1 | 1 | 1 |
| | Pure water | Balance | Balance | Balance | Balance | Balance | Balance | Balance | Balance | Balance |
| | Total (% by mass) | 100 | 100 | 100 | 100 | 100 | 100 | 100 | 100 | 100 |

The general name, brand name, etc. in Table 1 represent the following meaning.

Acrylic silicone emulsion: manufactured by Toyo Ink Mfg. Co. Ltd., solid parts of 40% by mass, average particle diameter 130 nm, minimum film-forming temperature (MFT)=0° C. or less Acrylic emulsion: Joncryl 7600, manufactured by Johnson Polymer, solid parts of 47% by mass, average particle diameter 90 nm, MFT-10° C. or less Polyurethane emulsion: Hydran HW930, manufactured by Dainippon Ink and Chemicals (DIC), solid parts of 50% by mass, average particle diameter 200 nm or less, MFT=0° C. or less Polyester emulsion: Pesresin A-520, Takamatsu Oil&Fat, Co., Ltd., solid parts of 30% by mass, average particle diameter 100 nm, MFT=30° C. or less PolyFox PF-151N: oligomeric nonionic fluorosurfactant (manufactured by OMNOVA Solutions Inc., active ingredient: 50% by mass)

Zonyl FS-300: polyoxyethylene perfluoroalkylether (manufactured by DuPont, active ingredient: 40% by mass)

Softanol EP-5035: polyoxyethylene polyoxypropylene branched alkylether (manufactured by Nippon Shokubai Co., Ltd., active ingredient: 100% by mass)

DKS NL-180: polyoxyethylene lauryl ether (nonionic surfactant, manufactured by Dai-Ichi Kogyo Seiyaku Co., Ltd., HLB value: 16.2, active ingredient: 100% by mass)

Proxel GXL: 1,2-benzisothiazolin-3-one as an active ingredient, fungicide, manufactured by Avecia Limited, active ingredient: 20% by mass, contains dipropylene glycol)

KM-72F: self-emulsifying silicone antifoaming agent (manufactured by Shin-Etsu Chemical Co., Ltd., active ingredient: 100% by mass)

Example 8

The recording ink of Example 8 was prepared in the same manner as in Example 1 except that 2.5 parts by mass of Zonyl FS-300 was changed to 1.0 part by mass of KF-643 (polyether-polymethylsiloxane copolymer, manufactured by Shin-Etsu Chemical Co., Ltd., active ingredient: 100% by mass).

Example 9

The recording ink of Example 9 was prepared in the same manner as in Example 1 except that 10 parts by mass of acrylic silicone emulsion was changed to 8.9 parts by mass of Joncryl 538J (acrylic emulsion, manufactured by BASF Corporation, solid parts of 45% by mass, average particle diameter 100 nm, MFT=50° C.).

Next, each recording ink of Examples 1 to 9 and Comparative Examples 1 and 2 was evaluated for ink properties as follows. The results are shown in Table 2. In addition, each recording ink was fed into the ink cartridge as shown in FIGS. 1 and 2, and the ink cartridge was installed in an inkjet printer, IPSIO G707 by Ricoh Company, Ltd. Discharge evaluation and image evaluation were carried out as follows. The results are shown in Table 2.

<Measurement of Surface Tension>

The surface tension of each recording ink is a static surface tension measured at 25° C. with a surface tensiometer (CBVP-Z, manufactured by Kyowa Interface Science Co., Ltd.) using a platinum plate.

<Preservation Stability>

Each recording ink was stored at 50° C. for one month, and the change in particle diameter was measured with a particle size distribution measuring device (Nanotrac UPA-EX150, manufactured by Nikkiso Co., Ltd.). The percentage change in average particle diameter (D50%) of ink after storage using the average particle diameter before storage as an initial vale was determined by the following numerical formula 2, and evaluated according to the following standards:

Percentage Change=[(average particle diameter after storage/average particle diameter before storage)−1]×100     <<Numerical Formula 2>>

[Evaluation Standards]
  A: percentage change less than ±5%
  B: percentage change from ±5% to 15%
  C: percentage change more than ±15%<
<Evaluation of Discharge Stability>

Discharge stability was evaluated as follows. Each recording ink filled in the ink cartridge was fed into the inkjet printer, IPSIO G707 by Ricoh Company, Ltd. The recoverability when printing was halted without capping or cleaning during operation was investigated and each reliability, in terms of how long (in seconds) it will take for injecting direction to be misaligned or for mass of discharging ink drops to be altered, was evaluated by following standards
[Evaluation Standards]
  A: 600 seconds or more
  B: 60 seconds or more and less than 600 seconds
  C: less than 60 seconds
<Evaluation of Color-Producing Property>

The ink, filled in the ink cartridge in the same way as in the evaluation of discharge stability, was fed into the inkjet printer, IPSIO G707 by Ricoh Company, Ltd and each solid image was printed by one pass. Regular paper was used for printing test. After prints were dried, each value of brightness was obtained by a reflective color spectroscopic colorimetry densitometer by X-Rite. The ratio of each measured saturation value to the saturation value of Japan Color Version 2 (yellow: 91.34, magenta: 74.55, cyan: 62.82) were calculated and evaluated by following standards. When the density of each color was measured with an X-Rite densitometer, prints with less density than the following density standards of each color were evaluated as C.
[Density Evaluation of Each Color]
  Yellow: 0.7 or more, Magenta: 0.9 or more, Cyan: 0.9 or more
[Paper for Printing Test]
  Regular paper: PPC paper Type 6200 by Ricoh Company, Ltd.

[Evaluation Standards of Saturation]
  A: 0.8 or more
  B: 0.7 or more and less than 0.8
  C: less than 0.7
<Evaluation of Scratch Resistance>

Each printed part of the image sample produced on the gloss paper by the method similar to saturation evaluation was rubbed back and forth for 5 times using a white cotton cloth with a load of 900 g by Crock Meter CM-1 by TOYO SEIKI Seisaku-sho, Ltd. Each sample was then observed with eyes and evaluated by following standards.
[Paper used for Printing Test]
  Gloss paper: PM Photo Print Paper (gloss) by Seiko Epson Corporation
  Professional Photo paper PR-101 by Canon Inc.
[Evaluation Standards]
  A: image dropouts and blur on image surroundings are scarce
  B: image dropouts are few, but blur can be seen on image surroundings
  C: notable image dropouts and blur on image surroundings
<Evaluation of Waterproofness>

Water droplets were dripped on each printed part of the image sample produced on the regular paper by the method similar to saturation measurement. Each condition of ink records was then observed with eyes and evaluated by following standards.
<Evaluation Standards>
  A: remain the same
  B: mark (water mark) is seen around the printed part received water droplets
  C: smear on the surrounding area of the printed part received water droplets
<Evaluation of Light Stability>

Each image sample produced on the regular paper by the method similar to saturation measurement was radiated with 0.35 W/m$^2$ (340 nm) of xenon irradiance comparable to outdoor sunlight under the environment of 70° C., 50% RH and 89° C. of black panel temperature for 24 hours using Atlas Weatherometer Ci35AW. Each resulted color deterioration and alteration before and after the irradiation was evaluated by following standards shown below.
[Evaluation Standards]
  A: almost the same
  B: alteration is recognized but acceptable
  C: large degree of color deterioration and alteration

TABLE 2

|  | Surface Tension (mN/m) | Ink Preservation Stability | Discharge Stability | Color-producing Property | Scratch Resistance | Water-proofness | Light Stability |
|---|---|---|---|---|---|---|---|
| Example 1 | 25.4 | A | A | A | A | A | A |
| Example 2 | 25.7 | A | A | A | A | A | A |
| Example 3 | 26.3 | A | A | A | A | A | A |
| Example 4 | 25.2 | A | A | A | A | A | A |
| Example 5 | 26.5 | A | A | A | A | A | A |
| Example 6 | 37.4 | A | A | B | B | A | A |
| Example 7 | 25.7 | A | B | A | A | A | A |
| Example 8 | 23.5 | A | A | A | A | A | A |
| Example 9 | 25.4 | A | A | A | B | A | A |
| Comparative Example 1 | 36.8 | C | B | B | C | C | A |
| Comparative Example 2 | 38.2 | — | A | A | A | C | C |

* In Table 2, "—" in the column of ink preservation stability of Comparative Example 2 indicates unmeasurable. In Comparative Example 2, a water-soluble dye is used, making it impossible to measure the particle diameter unlike a pigment. Therefore, the preservation stability cannot be evaluated.

From the results shown in Table 2, in Examples 1 to 9, by using the composite pigment particle ink of the present invention, the recording ink and the ink record utilizing the recording ink can be obtained, which has excellent preservation stability of ink, light stability comparable to organic pigment ink, very excellent color-producing property and high reliability on colorfastness resisting wear or water, compared to those of Comparative Examples 1 and 2.

The recording ink of Example 6 does not comprise a water dispersible resin; thus the color-producing property and scratch resistance are slightly lower compared to those in Example 3.

In Example 7, since the average particle diameter (D50%) of the composite pigment particle is more than 150 nm, the discharge stability is slightly lower compared to that in Example 1.

INDUSTRIAL APPLICABILITY

The recording ink of the present invention excels in discharge stability and preservation stability, has good image retention capabilities such as scratch resistance, waterproofness and light stability, etc., and makes it possible to obtain a high quality image that excels in color reproducibility of color image. Thus, the recording ink of the present invention can be suitably used for ink cartridge, ink record, inkjet recording apparatus, and inkjet recording method.

The inkjet recording apparatus and inkjet recording method of the present invention are applicable to a variety of recording using an inkjet recording method, and most suitably applicable to, for example, printers for inkjet recording, facsimile apparatuses, copying apparatuses, printer/fax/copier all-in-one devices, etc.

The invention claimed is:

1. A recording ink comprising:
   a composite pigment particle;
   a water-soluble solvent; and
   water,
   wherein the composite pigment particle is a primary particle coated with a coating resin,
   wherein the primary particle is a white pigment on the surface of which an oil-soluble dye is adsorbed or attached.

2. The recording ink according to claim 1, wherein the white pigment is at least one selected from the group consisting of a white inorganic pigment, a pearl pigment, and an extender pigment.

3. The recording ink according to claim 1, wherein
   the coating resin is one selected from the group consisting of a (meth)acrylic resin, a polyester resin, and a polyurethane resin, and
   wherein an acid value of the coating resin is from 50 mgKOH/g to 250 mgKOH/g.

4. The recording ink according to claim 1, wherein an average particle diameter (D50%) of the composite pigment particle is 150 nm or less.

5. The recording ink according to claim 1, wherein the water-soluble solvent is at least one selected from the group consisting of glycerin, diethylene glycol, triethylene glycol, 1,3-butanediol and 3-methyl-1,3-butanediol.

6. The recording ink according to claim 1, further comprising a water dispersible resin,
   wherein the water dispersible resin is one selected from the group consisting of a polyester resin, a polyurethane resin, a (meth)acrylic resin and an acrylic silicone resin, and a minimum film-forming temperature of the water dispersible resin is 30° C. or less.

7. The recording ink according to claim 1, further comprising a surfactant,
   wherein the surfactant comprises at least one selected from a silicone surfactant and a fluorosurfactant.

8. The recording ink according to claim 1, wherein a static surface tension at 25° C. is 35 mN/m or less.

9. An ink cartridge comprising:
   a container; and
   a recording ink which is contained in the container and which comprises a composite pigment particle, a water-soluble solvent, and water,
   wherein the composite pigment particle is a primary particle coated with coating resin, wherein the primary particle is a white pigment on the surface of which an oil-soluble dye is adsorbed or attached.

10. An inkjet recording method comprising:
    ink drop discharging to record an image by stimulating a recording ink which comprises a composite pigment particle, a water-soluble solvent, and water,
    wherein the composite pigment particle is a primary particle coated with a coating resin, wherein the primary particle is a white pigment on the surface of which an oil-soluble dye is adsorbed or attached.

11. The inkjet recording method according to claim 10, wherein the stimulation is at least one selected from the group consisting of heat, pressure, vibration and light.

* * * * *